(12) United States Patent
Wagner et al.

(10) Patent No.: US 12,552,132 B2
(45) Date of Patent: Feb. 17, 2026

(54) IMPACT-RESISTANT, DAMAGE TOLERANT COMPOSITES WITH SHEAR THICKENING FLUID LAYERS AND USES THEREOF

(71) Applicant: STF Technologies, LLC, Newark, DE (US)

(72) Inventors: Norman J. Wagner, Newark, DE (US); Richard Dombrowski, Lutherville, MD (US)

(73) Assignee: STF Technologies, LLC, Newark, DE (US)

( * ) Notice: Subject to any disclaimer, the term of this patent is extended or adjusted under 35 U.S.C. 154(b) by 1432 days.

(21) Appl. No.: 17/260,623

(22) PCT Filed: Jul. 16, 2019

(86) PCT No.: PCT/US2019/042011
§ 371 (c)(1),
(2) Date: Jan. 15, 2021

(87) PCT Pub. No.: WO2020/018539
PCT Pub. Date: Jan. 23, 2020

(65) Prior Publication Data
US 2021/0291486 A1    Sep. 23, 2021

Related U.S. Application Data

(60) Provisional application No. 62/699,281, filed on Jul. 17, 2018.

(51) Int. Cl.
*B32B 5/26* (2006.01)
*B32B 5/08* (2006.01)
*B64G 6/00* (2006.01)

(52) U.S. Cl.
CPC .................. *B32B 5/26* (2013.01); *B32B 5/08* (2013.01); *B32B 2250/05* (2013.01);
(Continued)

(58) Field of Classification Search
CPC ......... B32B 5/26; B32B 5/08; B32B 2250/05; B32B 2250/20; B32B 2260/023;
(Continued)

(56) References Cited

U.S. PATENT DOCUMENTS

| 3,751,727 A | 8/1973 | Shepard et al. |
| 4,739,007 A | 4/1988 | Okada et al. |

(Continued)

FOREIGN PATENT DOCUMENTS

| EP | 3 330 081 A1 | 6/2018 |
| EP | 3 384 790 A1 | 10/2018 |

(Continued)

OTHER PUBLICATIONS

Asija, "Impact response of shear thickening fluid (STF) treated ultra high molecular weight poly ethylene composites—study of the effect of STF treatment method" Thin-Walled Structures 126:16-25 (2017).

(Continued)

*Primary Examiner* — Travis M Figg
(74) *Attorney, Agent, or Firm* — Medler Ferro Woodhouse & Mills PLLC

(57) ABSTRACT

Composite materials incorporated with shear thickening fluids (STF) are disclosed. The STF-composites are light weight and include high tenacity textiles that dissipate/absorb energy from impact forces and exhibit damage resistance and self-healing functionality. Also disclosed are articles comprising STF-composite materials, such as safety suits and extra-vehicular mobility units, which include STF-intercalated textiles and composites. Methods for Manufacturing STF-composites are also disclosed.

16 Claims, 15 Drawing Sheets

(52) U.S. Cl.
CPC ..... *B32B 2250/20* (2013.01); *B32B 2260/023* (2013.01); *B32B 2260/046* (2013.01); *B32B 2262/101* (2013.01); *B32B 2262/106* (2013.01); *B32B 2262/14* (2013.01); *B32B 2264/101* (2013.01); *B32B 2307/54* (2013.01); *B32B 2307/558* (2013.01); *B32B 2307/56* (2013.01); *B32B 2307/72* (2013.01); *B64G 6/00* (2013.01)

(58) Field of Classification Search
CPC ........ B32B 2260/046; B32B 2262/101; B32B 2262/106; B32B 2262/14; B32B 2264/101; B32B 2307/54; B32B 2307/558; B32B 2307/56; B32B 2307/72; B64G 6/00
See application file for complete search history.

(56) References Cited

U.S. PATENT DOCUMENTS

| | | | |
|---|---|---|---|
| 7,226,878 B2* | 6/2007 | Wagner | B32B 5/026 2/2.5 |
| 7,498,276 B2 | 3/2009 | Wagner et al. | |
| 7,825,045 B1 | 11/2010 | Wagner et al. | |
| 8,404,162 B2 | 3/2013 | Okoli et al. | |
| 2005/0266748 A1* | 12/2005 | Wagner | B32B 5/026 442/168 |
| 2009/0004413 A1 | 1/2009 | Wagner et al. | |
| 2009/0305589 A1 | 12/2009 | Budden et al. | |
| 2013/0061739 A1 | 3/2013 | Cheong et al. | |
| 2016/0221303 A1 | 8/2016 | Jancar et al. | |
| 2018/0154606 A1* | 6/2018 | Francis | B32B 5/024 |
| 2018/0279692 A1* | 10/2018 | Witek | A41C 5/00 |

FOREIGN PATENT DOCUMENTS

| | | |
|---|---|---|
| JP | 2016-635226 A | 11/2016 |
| JP | 2017-100391 A | 6/2017 |
| JP | 2017-222222 A | 12/2017 |
| KR | 10-2012-0027867 A | 3/2013 |
| KR | 2015 0107987 A | 9/2015 |
| KR | 10-2016-0147292 A | 12/2016 |
| WO | WO 2011/099936 A1 | 8/2011 |
| WO | WO 2020/010224 A1 | 1/2020 |

OTHER PUBLICATIONS

Braza, "Lubricated Bearing Lifetimes of Multiply Alkylated Cyclopentane and a Linear Perfluoropolyether Fluid in Oscillatory Motion at Elevated Temperatures in Ultrahigh Vacuum" NASA/CR-2009-215637, p. 1-5 (2009).
Gon, "Complex Garment Systems to Survive in Outer Space" Textiles 7 (2):1-25 (2011).
Jones, "Properties of Perfluoropolyethers for Space Applications" NASA Technical Memorandum 106616 for ASME/STLE Tribology Conference, Lahaina, Hawaii (Oct. 1994).
Lee, "The ballistic impact characteristics of Kevlar woven fabrics impregnated with a colloidal shear thickening fluid" J Materials Science 38:2825-2833 (2003).
Materials Data Book, Cambridge University Engineering Department, 2003 Edition.
Minus, "The Processing, Properties, and Structure of Carbon Fibers" JOM p. 52-58 (Feb. 2005).
Nam, "Ballistic and Rheological Properties of STFs Reinforced by short Discontinuous Fibers" Proceedings of the Society for the Advancement of Material and Process Engineering Conference, Long Beach California, May 1-5, 2004.
Nettles, "Permeability After Impact Testing of Composite Laminates" NASA, Marshall Space Flight Center Research Paper, p. 1-14 (2018).
O'Connor, "Lotus Coating. Mitigating Surface Contamination" Presentation at Goddard Space Flight Center, NASA Tech Briefs Webinar (Sep. 22, 2015).
Park, "Modifying a silicone potting compound for space flight applications" Abstract, NASA Technical Report 19830039241 (1982).
Rheopecty, Wikipedia, the free encyclopedia, XP002794974 (Jun. 4, 2017) (available at https://en.wikipedia.org/w/index.php?title=Rheopecty&oldid=783741589).
Ross, "Z-2 Prototype Space Suit Development" 44th International Conference on Environmental Systems Jul. 13-17 Tucson Arizona, pp. 1-11 (2014).
"Silicon Compounds to Succinic and Succinic Anhydride. Size Measurement of Particles" in Kirk-Othmer, Encyclopedia of Chemical technology, 4th Ed vol. 22 pp. 256-276 (Wiley & Sons ed. 1997).
Sloan, "Composites in the Martian Suit" Composite World available at https://www.compositesworld.com/articles/composites-in-the-space-suit-for-mars (2016).
Tan, "Strengthening fabric armour with silica colloidal suspensions" Int. J. Solids and Structures 42(5-6):1561-1576 (2004).
Unnikrishnan, "Toughening of epoxy resins" Designed Monomers and Polymers 9(2):129-152 (2006).
Wilson, "How Liquid Body Armor Works" in HowStuffWorks Science, XP002794975 (Jul. 9, 2017) (available at https://web.archive.org/web/20170709113722/http://science.howstuffworks.com/liquid-body-armor1.htm).
International Search Report and Written Opinion in International Patent Application No. PCT/US2019/042011, mailed Oct. 30, 2019.
Maekawa, "On the Design Issues of Stratospheric Platform Airship Structure" in Technical Memorandum of National Aerospace Laboratory No. 722: Japan, National Aerospace Laboratory (Jun. 30, 2003) available at https://jaxa.repo.nii.ac.jp/record/42858/files/naltm0000772.pdf (Table 2).

* cited by examiner

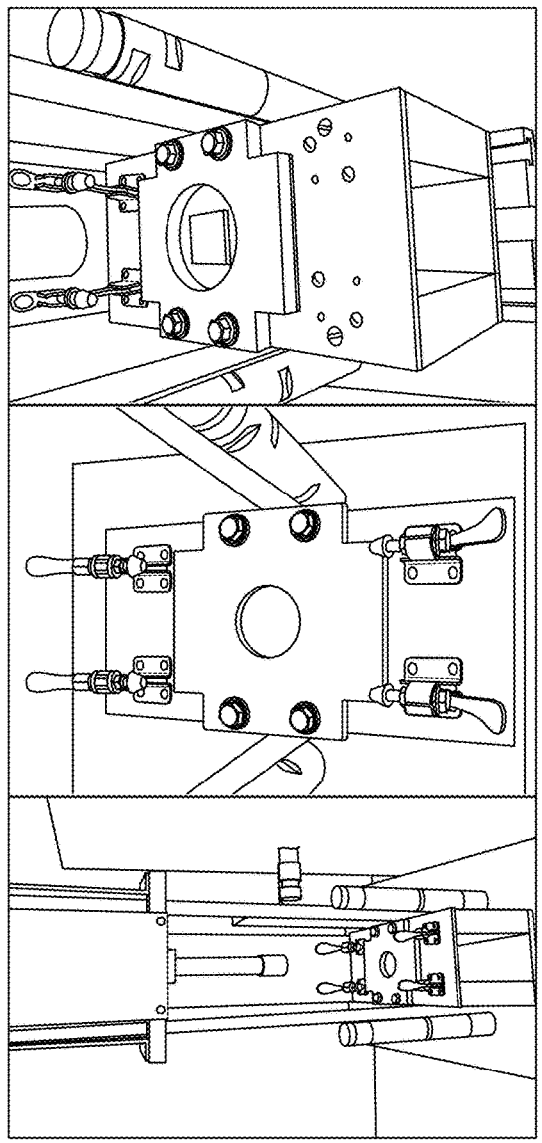
FIG. 2
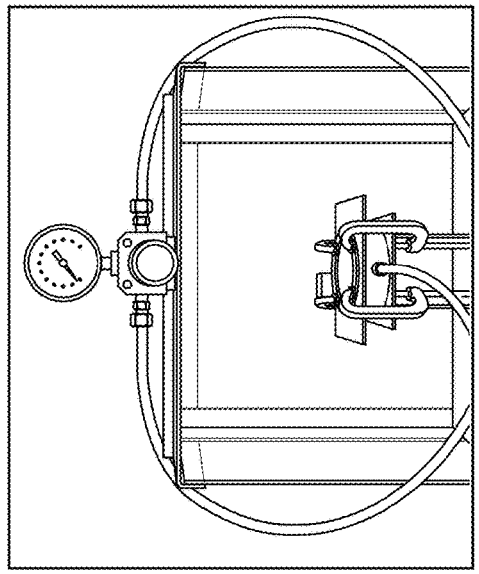
FIG. 3
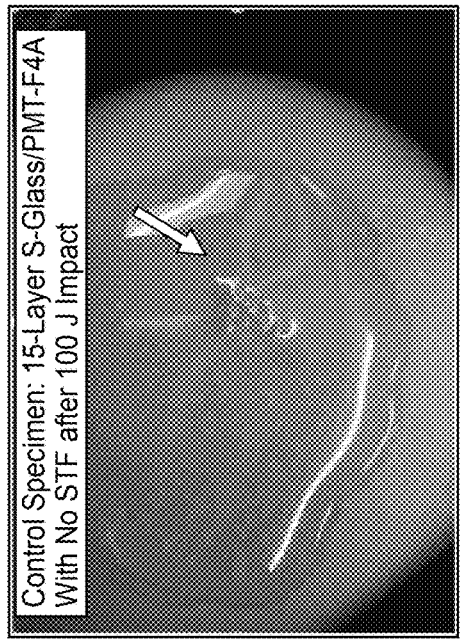

IMPACT-RESISTANT, DAMAGE TOLERANT COMPOSITES WITH SHEAR THICKENING FLUID LAYERS AND USES THEREOF

CROSS REFERENCE TO RELATED APPLICATIONS

This claims benefit of U.S. Provisional Application No. 62/699,281, filed Jul. 17, 2018, the entire contents of which are incorporated by reference herein.

FIELD OF THE INVENTION

The invention relates to lightweight composite materials with high mechanical strength. In particular, textiles reinforced with shear thickening fluids (STF) are combined with composite materials to create enhanced impact-resistant and damage tolerant structures.

BACKGROUND

Humans have been using composite materials for many years. Composites are made from two or more materials to create a new material with unique properties as compared to the starting materials. One great advantage of composite materials is strength and stiffness combined with lightness. Moreover, by selecting the appropriate combination of materials, one can produce a composite material with optimal properties for a particular structure or function, such as strength, shape, thermal conductivity, and the like. Composites include reinforced concrete, plywood, ceramics, fiberglass, and carbon fibers. One such material, fiberglass, was developed in the 1930's and consists of glass fibers woven into cloth and bonded together with a plastic or resin. Fiberglass composite material is used in many products, such as surfboards, marine vessel hulls, automobiles, etc. Another widely used composite material is made from carbon fibers. Carbon fibers are composed mainly of carbon atoms and have high stiffness, high tensile strength, low weight, and other desirable properties. Carbon fibers can be combined with other materials, such as resins, to form a carbon fiber composite that is used in many products, such automobiles, aircraft structures, sporting goods, wind turbine blades, etc.

Composite materials have also been used in the construction of extravehicular mobility units (EMU) worn by astronauts during space walks and moon landings. Existing EMUs contain a hard composite portion (referred to as a hard upper torso portion or HUT) that provides pressure containment and protection for the upper body of the wearer in addition to providing mounting and support for the controls module and the primary life support subsystems. Given the harsh environment of space, the success of astronauts in performing extra-vehicular activity (EVA) is highly dependent on the performance of the hard upper torso (HUT) and environmental protection garments (EPG) of the EMU they are wearing. Indeed, outer space is an extremely hostile environment with no atmosphere, extreme temperature, and various types of harmful radiation. Even in a low earth orbit, astronauts could be hit by small particles of dust or rock or orbiting spacecraft/satellite debris moving at very high speeds. Moreover, lunar or Martian exploration exposes the astronauts to worlds with little or no atmosphere and the added hazard of a potentially rocky surface with craters, hills, ravines, and the like, all of which are potentially unforgiving of any misstep taken by the astronaut. Any misstep may result in damage to the astronaut's HUT thus allowing the astronaut's air supply to leak out as well as possibly exposing the astronaut to the extraterrestrial atmosphere, resulting in near-instant death. Thus, it is vital that the HUTs are designed with adequate impact robustness and safety features in case of an accidental impact or fall.

Improving astronaut safety and survivability on extended duration missions will necessitate more durable HUTs that offer enhanced astronaut protection while being capable of withstanding extended exposure to the space environment and multiple EVAs. In contrast to Apollo-era EMUs that were required to perform for only a few days of use over their total lifetime, new EMUs for exploration of Mars may need to function effectively for extended durations, possibly of up to five hundred days or more and withstand harsher conditions, including the handling of sharp and rough rocks, tools or other objects and exposure to abrasive dust and particles. Resistance to fracture and leakage is an essential protective attribute of EMU suits that is not well-met by current materials. The energy of impact on these conventional hard, fiber-reinforced composites is absorbed by the panel, which causes fiber breakage, matrix cracking, and/or delamination. Moreover, adding additional composite layers to the suits for added protection will increase weight making the suit impractical for extended operation periods. Thus, there remains a critical need for lightweight and impact resistant composite materials for use in EVA or EMU suits.

Recent developments in HUT assemblies utilize highly engineered carbon fiber/fiberglass composite laminate that can be fabricated into complex shapes (see Sloan, 2016, Composites World, 2:44-47). These Z-2 suit HUT composite materials were capable of withstanding upwards of about 100 joules of impact energy (see Ross et al., 2014, $44^{th}$ International Conference on Environmental Systems 13-17). However, these suits may not be capable of being made sufficiently thin to be light enough for practical operation over extended times while strong enough to withstand higher impact energy of around 200 to 300 joules or repeated loading or impact that may result in accumulated damage.

One potential avenue to strengthen materials for use in high tenacity composite materials is incorporating layers of materials with shear thickening characteristics. Shear thickening is a non-Newtonian flow behavior of a fluid characterized by an increase in viscosity with an increase in shear stress. Most often, this behavior is observed in concentrated colloidal suspensions, which is due to the formation of "jamming clusters resulting from hydrodynamic lubrication forces between the particles" called "hydroclusters" (see Lee et al., 2003, J. Materials Sci. 38:2825-2833). However, to date, composite materials suitable for use in HUT assemblies and that exhibit shear thickening capabilities do not exist.

Thus, there remains a need in the art for damage tolerant and lightweight composite materials to provide a durable structure suitable for use in HUT assemblies as well as in other impact resistant structures, such as pressurized tanks, boat hulls, aircraft, sporting goods, safety equipment, windmill turbines, and automobiles.

SUMMARY OF THE INVENTION

The present invention provides light weight composite materials with high mechanical strength and increased impact resistance and damage tolerance. In particular, a composite combined with one or more STF-intercalated interlayers is provided wherein the STF fluid confers to the textile energy absorbing characteristics that enhance the impact resistance and damage tolerance of the composite structure.

One aspect of the invention features a multi-layer hybrid composite with increased impact resistance and damage tolerance, the composite material comprising: a first composite member comprising one or more composite layers; and at least one energy absorber layer disposed on or within the first composite member. In this aspect, the energy absorber layer includes a fabric that includes a plurality of fibers and a shear thickening fluid comprising at least one carrier fluid in which is suspended particles having an average particle size of less than about 4,000 nm. Also in this aspect, the shear thickening fluid is intercalated into the fabric, and the energy absorber layer confers to the multi-layer hybrid composite increased impact resistance and damage tolerance as compared to a multi-layer composite in the absence of an energy absorber layer. In some embodiments, the plurality of fibers have a tensile strength of at least about 250 MPa. In other embodiments, the plurality of fibers have a tensile strength of at least about 1 GPA and a specific strength of at least about 1,500 kN*m/kg. In yet other embodiments, the average particle size of the suspended particles is less than about 1,000 nm.

In some embodiments, each composite layer of the first composite member includes a plurality of carbon fibers, glass fibers, or combination of carbon fibers and glass fibers. For instance, in one embodiment, each composite layer of the first composite member comprises a plurality of glass fibers, such as a plurality of S-glass fibers. The fibers of the fabric may be selected from the group consisting of aramid fibers, ultra-high molecular weight polyethylene fibers, expanded/stretched polytetrafluoroethylene fibers, polyethylene terephthalate fibers, fibers made from copolymers of paraphenylenediamine and diaminodiphenyl ether, aromatic polyester fibers produced by polycondensation of 4-hydroxybenzoic acid and 6-hydroxynapthalene-2-carboxylic acid, and any combination thereof.

In an embodiment, the STF includes a carrier fluid that is a low volatility carrier fluid having a vapor pressure of less than about $1 \times 10^{-6}$ mPa at 25° C., and where the particles are silica particles suspended in the low volatility carrier fluid at a concentration in the range from about 40% to about 85% by weight particles. In another embodiment, the low volatility carrier fluid is a hydrocarbon fluid, a fluorinated polyether, a silicone fluid, or a combination of a hydrocarbon fluid and a fluorinated polyether. For instance, in a particular embodiment, the low volatility carrier fluid comprises a perfluoropolyether. In another particular embodiment, the low volatility carrier fluid comprises a multiply-alkylated cyclopentane.

In some embodiments, the multi-layer hybrid composite includes a second composite member that is disposed on the at least one energy absorber layer and includes one or more composite layers. In other embodiments, each composite layer of the second composite member comprises a plurality of carbon fibers, glass fibers, or a combination of carbon fibers and glass fibers. Moreover, the multi-layer hybrid composite provided herein may include an additional energy absorber layer disposed on the second composite member and a third composite member disposed on the additional energy absorber layer, where the third composite member comprises one or more composite layers. In further embodiments, each composite layer of the third composite member comprises a plurality of carbon fibers, glass fibers, or a combination of carbon fibers and glass fibers. In particular embodiments, this additional energy absorber layer comprises a fabric that includes a plurality of fibers having a tensile strength of at least about 250 MPa and a shear thickening fluid that is intercalated into the fabric and that includes at least one carrier fluid in which is suspended particles. In some embodiments, the plurality of fibers in the fabric of the additional energy layer have a tensile strength of at least about 1 GPa and a specific strength of at least about 1,500 kN*m/kg.

The fabric of the additional energy layer of the multi-layer hybrid composite may also include a plurality of fibers selected from the group consisting of aramid fibers, ultra-high molecular weight polyethylene fibers, expanded/stretched polytetrafluoroethylene fibers, polyethylene terephthalate fibers, fibers made from copolymers of paraphenylenediamine and diaminodiphenyl ether, aromatic polyester fibers produced by polycondensation of 4-hydroxybenzoic acid and 6-hydroxynapthalene-2-carboxylic acid, and any combination thereof. Moreover, the carrier fluid of the additional energy absorber layer may be a hydrocarbon fluid, a fluorinated polyether, a silicone fluid, or a combination of a hydrocarbon fluid and a fluorinated polyether.

In some embodiments, the first composite member comprises at least 5 composite layers. In others, the first composite member comprises at least 10 composite layers. In some aspects, the multi-layer hybrid composite will have a structural density of less than about 2 g/cm$^3$ and a thickness of less than about 0.5 cm. Additionally, the multi-layer hybrid composite may be used to construct an article or a hard upper torso portion of an article that also includes a multi-layer thermal micrometeoroid garment.

Another aspect of the invention features a composite structure that includes: (1) a first composite member comprising one or more composite layers; (2) a first energy absorber layer comprising a fabric in which is intercalated a shear thickening fluid and wherein the shear thickening fluid comprises at least one carrier fluid in which is suspended particles having an average particle size of less than about 4,000 nm; and (3) a second composite member comprising one or more composite layers. In this aspect, the first energy absorber layer may be disposed between the first composite member and the second composite member to dissipate impact energy when applied to the composite structure. Additionally, or alternatively, the fabric of the first energy absorber layer may comprise a plurality of fibers having a tensile strength of at least about 250 MPa. In still other embodiments, the fabric of the first energy absorber layer comprises a plurality of fibers having a tensile strength of at least about 1 GPa and a specific strength of at least about 1,500 kN*m/kg. In others, the suspended particles have an average particle size of less than about 1,000 nm.

In a particular embodiment, the composite structure includes a second energy absorber layer disposed on the second composite member, where the second energy absorber layer comprises a second fabric in which is intercalated a second shear thickening fluid. In this embodiment, the second fabric will include a plurality of fibers having a tensile strength of at least about 250 MPa and a second shear thickening fluid made of at least one carrier fluid in which is suspended particles having an average particle size of less than about 4,000 nm. Further, in this embodiment, there may be a third composite member of one or more composite layers that is disposed on the second energy absorber layer. In another embodiment, the plurality of fibers of the second fabric have a tensile strength of at least about 1 GPa and a specific strength of at least about 1,500 kN*m/kg, wherein the suspended particles in the second shear thickening fluid have an average particle size of less than about 1,000 nm.

In some embodiments, each composite layer of the first composite member, second composite member, third composite member, or any combination thereof, comprises a plurality of carbon fibers, glass fibers, or a combination of carbon fibers and glass fibers. In other embodiments, each of the first fabric and the second fabric comprises a plurality of fibers selected from the group consisting of aramid fibers, ultra-high molecular weight polyethylene fibers, expanded/stretched polytetrafluoroethylene fibers, polyethylene terephthalate fibers, fibers made from copolymers of paraphenylenediamine and diaminodiphenyl ether, aromatic polyester fibers produced by polycondensation of 4-hydroxybenzoic acid and 6-hydroxynapthalene-2-carboxylic acid, and any combination thereof. For instance, in one embodiment, the first fabric and the second fabric comprise a plurality of aramid fibers.

In some embodiments, the first shear thickening fluid and the second shear thickening fluid of the composite structure each comprise about 40% to about 85% by weight of particles. In other embodiments, the first shear thickening fluid and the second shear thickening fluid comprise about 60% to about 70% by weight of particles, and the particles are silica particles having an average particle size of between about 300 nm and about 700 nm and an aspect ratio of about 1:1 to about 10:1. In other embodiments, the carrier fluid of the first shear thickening fluid, the second shear thickening fluid, or both the first shear thickening fluid and the second shear thickening fluid is a low volatility carrier fluid having a vapor pressure of less than about $1 \times 10^{-6}$ mPa at 25° C. For instance, the low volatility carrier fluid may comprise a perfluoropolyether or a multiply-alkylated cyclopentane.

The composite structure described above may also have a structural density of less than about 2 g/cm$^3$ and a thickness of less than about 0.5 cm. In some embodiments, the composite structure is used to construct an article, such as a hard upper torso component of an extravehicular mobility unit, a marine vessel hull, an automobile component, a motorcycle component, a bicycle, a windmill turbine blade, a safety helmet, sporting equipment, or a storage tank. In some embodiments, the article is sporting equipment selected from the group consisting of a surfboards, skateboards, snowboards, skis, hockey sticks, lacrosse sticks, ice skates, and safety padding.

Another aspect of the invention features an extravehicular mobility unit with increased impact resistance and damage tolerance. This extravehicular mobility unit will include a multilayer garment comprising at least one absorber layer, the absorber layer comprising a shear thickening fluid intercalated into a fabric, wherein the shear thickening fluid comprises at least one carrier fluid in which is suspended particles at a concentration in the range from about 40% to about 80% by weight. In addition, this extravehicular mobility unit will include a hard upper torso portion comprising the multilayer hybrid composite that includes any of the features described above. In some embodiments, the extravehicular mobility unit will include a low friction layer disposed between the multilayer garment and the hard upper torso portion. In some aspects, the low friction layer comprises a fabric comprising a plurality of polytetrafluoroethylene fibers or a polytetrafluoroethylene film.

These and other features, aspects, and advantages of the present invention will become better understood with regard to the following description, appended claims, and accompanying drawings.

BRIEF DESCRIPTION OF THE DRAWINGS

FIG. 2 are photographs of the Dynatup impact tester (left panel) with the original perfectly clamped sample holder (center) compared to the modified sample holder with a three inch window for accommodating the STF-intercalated outer layers (right panel).

FIG. 3 illustrates the leakage detection system. The left panel is photograph of an example test performed on a composite layer without an STF-intercalated layer and shows leakage (evident as gas bubbles indicated by arrow) following a 100 J impact. The right panel is an image of the leakage detection system assembled with a specimen.

DETAILED DESCRIPTION OF THE INVENTION

Figure 1:
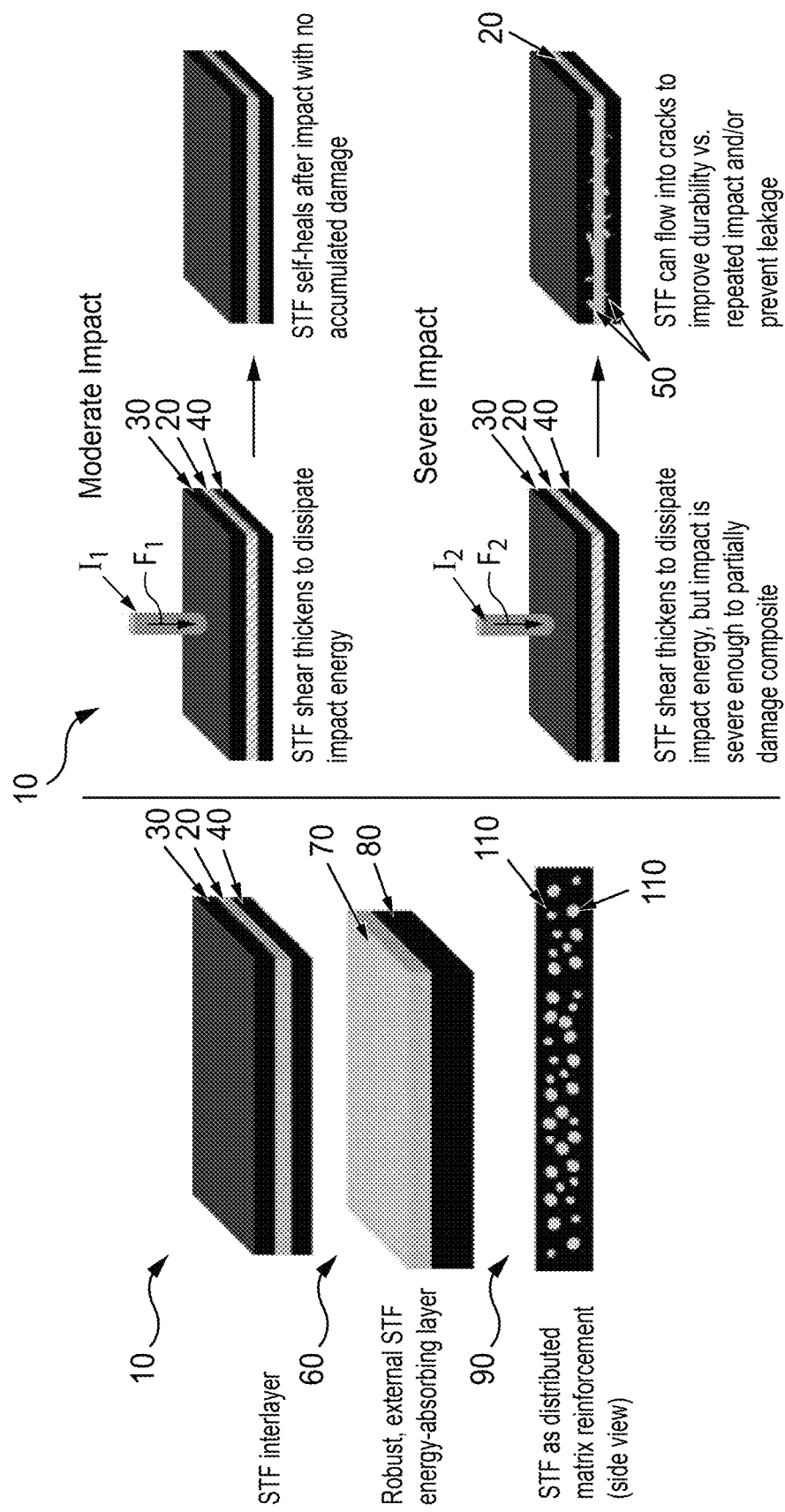
FIG. 1A depicts diagrams of various embodiments of the STF-composite materials. The STF layer/material is shown in light gray. The S-glass or carbon fiber composite material is shown in black. The top diagram depicts an STF-interlayer between two composite layers. The middle diagram depicts an external STF energy-absorbing layer disposed on a composite layer. The bottom diagram depicts a side view of STF distributed in a matrix.
FIG. 1B depicts diagrams of moderate impact (top) and severe impact (bottom) on the STF-composites provided herein.

Provided herein are hybrid composites that combine shear thickening fluids (STFs) with hard composite materials to create new STF-composite structures with superior impact and damage resistance and self-healing functionality. The STF component dissipates large amounts of impact energy as it transitions to a shear thickening state at and around the area of impact. Furthermore, the reversible nature of the shear thickening prevents damage accumulation and weakening upon repeated impact. Thus, the field-responsive nature of the STF allows the fluid response to be tuned to adapt to different levels of impact, conferring to the STF-composite optimal impact properties over a range of impact energies. In contrast, conventional materials are often optimized for a single energy or a limited range of energies, leading to sub-optimal impact response at higher or lower impact energies. Additionally, the STF component can flow into cracks or damaged zones in the composite, thereby providing a temporary seal to reduce or eliminate leakage. This property can confer to the STF-composite structure improved pressure sealing characteristics that prevent leakage of the pressurized structure (i.e. "self-healing" functionality).

The STF-composite structures described herein directly address the need for thin, lightweight composite materials that can be fabricated into complex geometries. As such, the STF-composites of the instant invention can be used in combination with and/or as part of an environmental protection garment (EPG). For example, the STF-composites are suitable for use as the hard upper torso (HUT) component of an extravehicular mobility unit (EMU) to provide increased protection to the wearer when conducting operations in low-earth orbit or during interplanetary exploration. Further, the STF-composites of the instant disclosure can be used to enhance the damage resistant properties of windmill blades, fuel and storage tanks, marine vessel hauls and can also be used in impact-protective consumer and/or sporting goods.

All percentages expressed herein are by weight of the total weight of the composition or mixture unless expressed otherwise. All ratios expressed herein are on a weight (w/w) basis unless expressed otherwise.

Ranges may be used herein in shorthand, to avoid having to list and describe each value within the range. Any appropriate value within the range can be selected, where appropriate, as the upper value, lower value, or the terminus of the range.

As used herein, the singular form of a word includes the plural, and vice versa, unless the context clearly dictates otherwise. Thus, the references "a", "an", and "the" are generally inclusive of the plurals of the respective terms. For example, reference to "a method" or "a fabric" includes a plurality of such "methods", or "fabrics." Likewise the terms "include", "including", and "or" should all be construed to be inclusive, unless such a construction is clearly prohibited from the context. Similarly, the term "examples," particularly when followed by a listing of terms, is merely exemplary and illustrative and should not be deemed exclusive or comprehensive.

The term "comprising" is intended to include embodiments encompassed by the terms "consisting essentially of" and "consisting of". Similarly, the term "consisting essentially of" is intended to include embodiments encompassed by the term "consisting of."

The methods and compositions and other advances disclosed herein are not limited to particular equipment or processes described herein because such equipment or processes may vary. Further, the terminology used herein is for describing particular embodiments only and is not intended to limit the scope of that which is disclosed or claimed.

Unless defined otherwise, all technical and scientific terms, terms of art, and acronyms used herein have the meanings commonly understood by one of ordinary skill in the art in the field(s) of the invention, or in the field(s) where the term is used. Although any compositions, methods, articles of manufacture, or other means or materials similar or equivalent to those described herein can be used in the practice of the present invention, the preferred compositions, methods, articles of manufacture, or other means or materials are described herein.

The term "about" refers to the variation in the numerical value of a measurement, e.g., temperature, length, width, height, weight percentage, etc., due to typical error rates of the device used to obtain that measure. In one embodiment, the term "about" means within 5% of the reported numerical value.

The term "composite material" or "composite" means a material made from two or more constituent materials with different physical and/or chemical properties that, when combined, produce a material with characteristics different from the individual components.

The terms "Environmental Protection Garment" and "EPG" are used interchangeably herein to refer to apparel worn to protect the wearer against harmful environmental conditions. EPGs include all of the fabric layers of the TMGs in addition to the restraint and bladder layers.

The terms "Extravehicular Mobility Unit" and "EMU" are used interchangeable herein to refer to an independent anthropomorphic spacesuit that provides environmental protection, mobility, life support, and communications for astronauts performing extravehicular activity and consists of a hard upper torso assembly, arm garment sections and gloves, a life support system, a helmet, and a soft lower torso assembly.

The terms "Extravehicular Activity" and "EVA" are used interchangeably herein to refer to any activity done by an astronaut outside a spacecraft beyond Earth's appreciable atmosphere, including, but not limited to, space walks, moonwalks, or operations on extraterrestrial landscapes (e.g., Mars).

The terms "fabric" and "textile" are used interchangeable herein to refer to a sheet-like structure comprised of fibers or yarns made of fibers. "Engineering fabrics" or "Engineering textiles" are used herein to refer to fabrics made from durable fibers or, in some cases, high tenacity fibers.

The term "flexural rigidity" means the force required to bend a non-rigid structure in one unit of curvature and/or the resistance offered by the structure while undergoing bending.

The term "high tenacity fabric" is used herein to refer to a fabric or composite material comprised of high tenacity fibers.

The terms "hard upper torso" and "HUT" are used interchangeably herein and refer to the central component of a space suit, such as an extravehicular mobility unit or Z-2 suit. The HUT forms a rigid enclosure about the upper body of the occupant, providing pressure containment for this part of the body.

The term "high tenacity fiber" is used herein to refer to a fiber having a tensile strength of at least about 250 MPa.

The terms "intercalated", "intercalation", "intercalating", "intercalate" as used herein to refer to STF treatment of a fabric means that the STF fluid is inserted into the fabric and between the fibers and within the yarns. STF "intercalation" not only fills the any gaps or holes between the fibers in the weave, but coats the individual fibers themselves.

The term "load" or "loading" as used herein refers to a structural load or force applied to a structure or textile.

The terms "Micrometeoroids and Orbital Debris" or "MMOD" are used interchangeably herein and refer to naturally occurring micrometeoroids and man-made debris that orbit the Earth and travel at average speeds of 22,000 miles per hour.

The term "outgassing" as used herein refers to the release of gas that was dissolved, trapped, frozen, or absorbed in some material. "Outgassing" can include sublimation, evaporation, desorption, and gas products of slow chemical reactions. Outgassing can be increased due to increasing temperature and/or decreasing pressure.

The term "prepreg" as used herein refers to a textile or composite component that has been impregnated with a resin such that the composite is formed and/or adhered to another component layer, such as a composite layer or an STF-intercalated fabric layer following setting or heat curing.

The term "specific strength" as used herein refers to the strength of a material divided by its density. For fibers or textiles, tenacity is the typical measure of specific strength.

The term "tensile strength" as used herein refers to the capacity of a material to withstand loads tending to elongate the material.

The terms "thermal micrometeoroid garment" and "TMG" are used interchangeably herein and refer to the outer layers of a space suit. The TMG serves to insulate the suit occupant and prevent heat loss, the shield the occupant from harmful solar radiation, and to product the occupant from MMOD, which could puncture the suit and depressurize it.

The term "vapor pressure" means the pressure exerted by a vapor in thermodynamic equilibrium with its condensed phases at a given temperature in a closed system. A substance with a high vapor pressure at normal temperatures may be referred to as "volatile."

The term "Young's modulus" refers to the measure of the ability of a material to withstand changes in length when under lengthwise tension or compression. It is measured as the ratio of stress along an axis to the strain along the same axis, within the region where the stress-strain relationship is linear.

All patents, patent applications, publications, technical and/or scholarly articles, and other references cited or referred to herein are in their entirety incorporated herein by reference to the extent allowed by law. The discussion of those references is intended merely to summarize the assertions made therein. No admission is made that any such patents, patent applications, publications or references, or any portion thereof, are relevant, material, or prior art. The right to challenge the accuracy and pertinence of any assertion of such patents, patent applications, publications, and other references as relevant, material, or prior art is specifically reserved.

Provided herein are composite structures comprising STF that exhibit impact-resistant, damage tolerant, and self-healing properties. In particular, STF is combined with composite materials as an exterior film, an interlayer, or integrated within the composite structure. For instance, in one embodiment, the STF is intercalated into a high tenacity textile and the STF-textile is further integrated within a composite structure as one or more interlayers. In such embodiments, the STF-interlayers serve as energy absorbing layers within a hard composite structure forming a hybrid sandwich structure. In other embodiments, the STF-fabric forms an external layer outside the hard composite to reduce the amount of impact energy that is transmitted to the composite and/or to spread the impact energy over a larger area. In yet other embodiments, the STF material is dispersed as a filler within a matrix phase encapsulated and/or surrounded by the hard composite material. The STF-composites provided herein exhibit energy absorbing and/or energy dissipating characteristics thereby conferring to the STF-composite increased impact resistance and/or damage tolerance as compared to equivalent composite structures in the absence of the STF material. Further, the STF-composites provided herein exhibit self-healing properties wherein the STF flows into cracks and gaps caused by severe impacts or repeated impacts.

The STF-composites of the instant disclosure comprise an STF component and a composite component. The STF component may further comprise an STF fluid and a fabric or textile component. In some embodiments, the STF fluid is coated onto the fabric. However, it is preferable that the STF fluid be intercalated into the fabric, which may be a fabric containing high tenacity fibers. The STF-intercalated fabric can then be integrated with the composite component. The STF fluids, STF-intercalated fabrics, STF-composites, and articles/structures incorporating the STF-composites of the instant invention will now be described in more detail below.

Composite Materials

The STF-composites provided herein utilize STF and/or STF-intercalated fabrics or textiles to increase the damage resistance of the composite structure. Composite materials suitable for use include, but are not limited to, reinforced concrete, composite wood, reinforced plastics, ceramic matrix composites, metal matrix composites, or advanced composites, such as carbon fiber, graphite, and glass fibers. In some embodiments, the desirable selection of composite materials may be light weight and exhibit high stiffness/strength. For instance, suitable composite materials may have a Young's modulus of at least about 1 Gigapascal (GPa), e.g., about 1 GPa, 2 GPa, 3 GPa, 4 GPa, 5 GPa, 6 GPa, 7 GPa, 8 GPa, 9 GPa, 10 GPa, 15 GPa, 20 GPa, 25 GPa, 30 GPa, 35 GPa, 40 GPa, 45 GPa, 50 GPa, 55 GPa, 60 GPa, 65 GPa, 70 GPa, 75 GPa, 80 GPa, 85 GPa, 90 GPa, 95 GPa, 100 GPa, 110 GPa, 120 GPa, 130 GPa, 140 GPa, 150 GPa, 160 GPa, 170 GPa, 180 GPa, 190 GPa, or 200 GPa, or more. Preferably, the composite material will have a Young's modulus of at least about 10 GPa. For instance, in some embodiments, the composite is fiberglass having a Young's modulus of about 15 GPa. Exemplary composite materials with the desired strength and weight may comprise carbon fibers or glass fibers. For instance, in certain embodiments, the STF-composite comprises carbon fibers. In other embodiments, the STF-composite comprises glass fibers, such as A-glass, C-glass, D-glass, E-glass, ECR-glass, AR-glass, R-glass, S-glass, S2-glass. In a particular embodiment, the STF-composite comprises S-glass or S2-glass fibers. In other embodiments, the STF-composite comprises E-glass fibers. In yet other embodiments, the composite materials comprises a combination of glass fibers and carbon fibers (e.g., hybrid S2-glass and intermediate modulus carbon fibers).

In particular embodiments, high tenacity fibers, such as carbon fibers, glass fibers, or a combination of carbon fibers and glass fibers are mixed with a resin component, wherein the resin component reinforces the fiber matrix to create a light weight and durable composite material. In such embodiments, the resin may be an epoxy resin, a polyurethane resin, or a toughened epoxy resin. The fiber and resin mixture is then set over a period of time at ambient temperature or heat cured to produce the composite material.

Composite materials comprising carbon fibers and/or glass fibers are particularly useful in structures and applications requiring lightweight and strong materials that can be designed to fit various geometric shapes and configurations. For instance, current space suit designs incorporate glass fiber (fiberglass) or hybrid glass fiber/carbon fiber composites as the HUT portion. Moreover, these types of composites can be used to craft vehicle and vessel hulls, aircraft components, bicycle, motorcycle and automobile components, sporting goods (e.g., surfboards, skateboards, snowboards, skis, hockey sticks, portions of ice skates, lacrosse sticks) and protective sportswear (e.g., helmets). However, severe impact and/or repeated impact still presents a risk of cracking/fracture. Moreover, when used in a pressure-sealing structure, such as in an aircraft or space suit, fractures produce pressure leaks leading to depressurization. Pressure leaks in space suits caused by impacts with micrometeoroids, orbital debris, or falling onto extraterrestrial rock formations can result in rapid depressurization and death of the wearer. Likewise, rapid depressurization of aircraft caused by impacts to the hull can cause loss of cabin pressure. As such, by incorporating the STF fluid into the composite design, the impact and fracture resistant properties of the composite material can be enhanced. Further, the self-healing properties of the STF fluid can fill the cracks and leaks caused by severe or repeated impact thereby preventing depressurization.

In certain applications, it may be desirable to use composite materials with insulating properties. For instance, it may be necessary for the use of composite materials in deep sea submersibles or in EMU/EPG apparel with high insulation capabilities to prevent heat loss. Thus, composite materials with low thermal conductivity are particularly suitable for such applications. In some embodiments, composite materials suitable for use in the STF-composites have a thermal conductivity of less than about 10 watts per meters Kelvin (w/(m*K)), e.g., 9, 8, 7, 6, 5, 4, 3, 2, 1.9, 1.8, 1.7, 1.6, 1.5, 1.4, 1.3, 1.2, 1.1, 1.0, 0.9, 0.8, 0.7, 0.6, 0.5, 0.4, 0.3, 0.2, 0.1 w/m*K. In other embodiments, composite materials suitable for use in the STF-composites have a thermal conductivity of less than about 5 w/m*K. For instance, STF-composites with good thermal insulation characteristics may comprise glass fibers, such as S-glass fibers.

To increase the durability and impact resistance of the composite materials while keeping the structural density of the resulting composite within the desired range, STF fluids or STF-intercalated fabric interlayers may be incorporated into the structure. The STF fluids, STF-intercalated fabrics, and STF-composites are described in detail below.

STF Fluids

As noted above, STF fluid is integrated into the composite structure to produce a hybrid STF-composite with increased impact and damage tolerance with self-healing functionality. While some embodiments utilize STF fluid dispersed within the composite matrix, other suitable STF-composite designs include one or more STF-textile layers, such as outer layers and/or interlayers. The STF fluid imparts increased strength to the STF-composite by strengthening the surrounding textile/composite in response to sheer stress. As will become apparent from this disclosure, the STF-intercalation described herein does not add great amount of weight, structural density, or thickness to the textile and/or composite.

The STF fluids provided herein may be concentrated dispersions of particulates within a carrier fluid that exhibit an increase in viscosity with increasing applied stress. When intercalated into fibers or a fabric, the STF remains flowable so as to not impede fabric flexibility, but modifies the coefficient of friction between the fibers by rigidizing during an impact event. Further, when integrated into the STF-composites provided herein, the STF fluid's properties enable the fluid to dissipate the impact energy applied to the STF-composite. When a shear stress is applied to the fabric or composite structure, hydroclusters of the particulates form and become rigid rendering that portion of the fabric more resistant to fracture as compared to the same material without STF. Thus, in addition to filling the gaps in the fibers formed from a particular fabric weave, the STF fluid influences the properties of the fibers and/or yarns themselves. Likewise, STF fluid can flow into and fill the cracks or fractures formed in the surrounding composite structure following an impact to improve the durability of the composite and/or to prevent leakage.

While not intending to be bound by theory, the transition to a shear thickening state of the hydroclusters is stress dependent, and the impact with a hypervelocity projectile would require a quick transition rate to effectuate a resistance to penetration. At low strain rates, for example associated with the wearer of an article of clothing comprising STF-intercalated fabrics, the fluid will offer little impediment to the article flexure and deformation. However, at the high strain rates associated with, e.g., a high velocity projectile, the fluid will increase in viscosity and in doing so, dissipate the impact energy thereby enhancing the damage resistance of the STF-composite. These unique properties of STF fluids result, in part, from the composition of the STF fluid, which comprises a plurality of particles and one or more carrier solvents or fluids.

In an STF fluid suitable for use herein, the particles are suspended in one or more carrier fluids. The STF particles may be stabilized in the carrier fluid or dispersed by charge, Brownian motion, adsorbed surfactants, and adsorbed or grafted polymers, polyelectrolytes, polyampholytes, or oligomers. It is preferable that the particles be rigid colloidal particles. Particles suitable for use in the STF-incorporated fabrics and composites provided herein may be of any solid material, including spherical amorphous silica such as that produced via Stöber type synthesis, synthetic inorganic particles synthesized via solution precipitation processes such as precipitated calcium carbonate, or synthesized by gel-sol techniques (hematite, $TiO_2$), or fumed silica, or carbon black. In some embodiments, natural inorganic particulates such as montmorillonite and kaolin clays may be dispersed in carrier fluid to exhibit shear thickening behavior. In other embodiments, ground mineral powders, such as quartz, calcite, talcs, gypsum, and/or mica may be dispersed in carrier fluid to exhibit shear thickening behavior. The solid dispersed phase may also be polymeric in nature, such as plastisols generated through emulsion polymerization processes such as poly (tetrafluoroethylene), poly (methyl methacrylate) (PMMA), polystyrene (PS) microspheres. The solid phase may also be starch or other natural polymers. In some embodiments, particles suitable for use in the present disclosure may be oxides (e.g., silicon dioxide ($SiO_2$)); carbonates, (e.g., calcium carbonate, aluminum oxides, titanium dioxide ($TiO_2$), silicon carbon); titanates; synthetically occurring minerals; naturally occurring minerals; polymers (e.g., polystyrene or polymethyl methacrylate); carbon particles, including carbon black, carbon nanotubes, graphene, diamond, and graphite; metallic particles, including gold and silver nanoparticles; kaolin; montmorillonite; natural or synthetic clays, such as laponite; zeolites; and/or any combination of these particles. For instance, silica ($SiO_2$) particles may be used in the STF compositions provided herein. In other embodiments, polystyrene or polymethyl methacrylate particles are used in the STF compositions. In other embodiments, the STF composition comprises graphene or clay. In yet other embodiments, the STF composition comprises a mixture of particles, such as a mixture of silica and a clay or zeolite.

Suitable particle shapes include spherical particles, elliptical or elongated particles, or disk-like or clay particles. The particles may be synthetic and/or naturally occurring minerals. Also, the particles can be either monodisperse, bidisperse, or polydisperse in size and shape. In some embodiments, the particles suspended in the STF fluid are spherical (e.g., having an aspect ratio of about 1:1). In other embodiments, the particles suspended in the STF fluid are elongated having a width to height aspect ratio from between about 1.5:1 to about 20:1; preferably, the aspect ratio is from about 2:1 to about 15:1; more preferably, it is from about 3:1 to about 10:1. Furthermore, the diameter of the particles should be much smaller than the diameter of the fibers of the fabric. Particle size can be measured using a variety of art-standard particle size analyzer techniques, such as light scattering, gravitational settling of the particle, Brownian motion analysis, high definition image processing, and the like. Thus, in particular embodiments, the particles suspended in the STF fluid have an average particle size of less than about 4,000 nanometers (nm), e.g., 4,000 nm, 3,900 nm, 3,800 nm, 3,700 nm, 3,600 nm, 3,500 nm, 3,400 nm, 3,300 nm, 3,200 nm, 3,100 nm, 3,000 nm, 2,900 nm, 2,800 nm, 2,700 nm, 2,600 nm, 2,500 nm, 2,400 nm, 2,300 nm, 2,200 nm, 2,100 nm, 2,000 nm, 1,900 nm, 1,800 nm, 1,700 nm, 1,600 nm, 1,500 nm, 1,400 nm, 1,300 nm, 1,200 nm, 1,100 nm, 1,000 nm, 900 nm, 890 nm, 880 nm, 870 nm, 860 nm, 850 nm, 840 nm, 830 nm, 820 nm, 810 nm, 800 nm, 790 nm, 780 nm, 770 nm, 760 nm, 750 nm, 740 nm, 730 nm, 720 nm, 710 nm, 700 nm, 690 nm, 680 nm, 670 nm, 660 nm, 650 nm, 640 nm, 630 nm, 620 nm, 610 nm, 600 nm, 590 nm, 580 nm, 570 nm, 560 nm, 550 nm, 540 nm, 530 nm, 520 nm, 510 nm, 500 nm, 490 nm, 480 nm, 470 nm, 460 nm, 450 nm, 440 nm, 430 nm, 420 nm, 410 nm, 400 nm, 390 nm, 380 nm, 370 nm, 360 nm, 350 nm, 340 nm, 330 nm, 320 nm, 310 nm, 300 nm, 290 nm, 280 nm, 270 nm, 260 nm, 250 nm, 240 nm, 230 nm, 220 nm, 210 nm, 200 nm, 190 nm, 180 nm, 170 nm, 160 nm, 150 nm, 140 nm, 130 nm, 120 nm, 110 nm, 100 nm or less. In another embodiment, the particles suspended in the STF fluid have an average particle size of less than about 2,000 nm. In a preferred embodiment, the average particle size is between about 100 nm and about 1000 nm. In a more preferred embodiment, the particles have an average particle size of about 300 nm to about 700 nm. For instance, in one particular embodiment, monodisperse, spherical silica particles having an average particle size of about 500 nm are suspended in the carrier fluid. In some embodiments, the particles may be nanoparticles fused together, such as in fumed silica and carbon black, such that the aggregate particles are used to make a shear thinking fluid.

The shear thickening properties of the STF fluids described herein are influenced by the concentration of particles suspended in the carrier fluid. Thus, it is preferred that at least about 30% by volume of particles are suspended in the carrier fluid. For aggregates, these may be effective volume fractions of the aggregates, such that the actual particle volume fraction may only be a few percent. For instance, suitable STF fluid concentrations of particles by volume include 30%, 31%, 32%, 33%, 34%, 35%, 36%, 37%, 38%, 39%, 40%, 41%, 42%, 43%, 44%, 45%, 46%, 47%, 48%, 49%, 50%, or higher. It is preferred that the STF particle concentration be greater than 50% by volume to ensure strong shear thickening of the STF fluid. For instance, preferred STF fluid concentrations of particles by volume include 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, or higher. Other suitable STF formulations comprise about 40% to about 85% by weight of particles; preferably, the particles are present in the STF fluid at about 50% to about 75% by weight; more preferably, between about 60% to 70% by weight. For instance, in one particular embodiment, the STF formulation comprises 60-70% by weight monodisperse, spherical silica particles having an average size of about 400 nm to about 600 nm. In some embodiments, a surfactant or dispersant is also added to the STF fluid. These dispersants act to prevent particle aggregation due to van der Waals attraction and modulate the interparticle interactions that determine the critical shear rate and strength of shear thickening. Such surfactants and dispersants may include a number of amphiphilic molecules, including short chain alcohols (octadecanol or similar), fatty acids, natural emulsifiers (lecithin), ionic surfactants (SDS), non-ionic surfactants (polyoxyalklyene alkyl ether), polymers/co-polymers/block-copolymers and salts of polymers/co-polymers/block copolymers (such as BASF Pluronic products), succinimide detergents, low molecular weight acidic polyesters, polyisobutylene amide alkeneamine polyol and similar dispersants, salts of unsaturated polyamine amides.

As noted above, the STF fluid will also contain one or more carrier solvents or fluids, which confer flowability to the STF fluid to produce a fluid with a shear thickening property. Suitable solvents for use in an STF fluid can be aqueous in nature (i.e., water with or without added salts, such as sodium chloride, and buffers to control pH) for electrostatically stabilized or polymer stabilized particles, organic (e.g., ethylene glycol, polyethylene glycol, ethanol), or silicon based (e.g., silicon oils, phenyltrimethicone). The carrier fluid may also be composed of compatible mixtures of solvents, and may contain free surfactants, polymers, and oligomers. The carrier fluid should be environmentally stable so that it remains integral to the fabric and suspended particles.

In particular embodiments, however, STF fluids and STF-fabrics/composites with low outgassing properties are desired. Outgassing occurs when the carrier fluid evaporates especially when, for instance, it is exposed to a vacuum or low air pressure environment. Outgassing, in turn, can result in re-condensation and collection of solvent fluid in equipment or human lungs causing equipment damage and health problems, respectively. Potential cross-contamination of solvent material may be especially dangerous in harsh environments, such as at great depths below sea-level (e.g., in response to a rapid change in pressure), low-earth orbits, outer space, or extraterrestrial surfaces where equipment failure may result in loss of life and/or where repair/replacement of damaged equipment is impractical or impossible. To this end, suspending the particles in low volatility carrier fluids reduces the incident of outgassing of the final product. Preferably, less than about 10% mass of the carrier fluid will be lost under a vacuum as measured using art-standard testing protocols well within the purview of the skilled artisan, such as the ASTM standard 595 or the NASA Standard 6001-B methods. More preferably, less than about 5%, e.g., about 5%, 4%, 3%, 2%, 1% or less of the mass of the carrier fluid is lost under a vacuum. Further, it is desired that less than about 2% of the mass of carrier fluid that is evaporated under a vacuum be recondensed and collected in a standard outgassing test, such the standard protocols discussed herein. Preferably, less than about 1%, e.g., about 1%, 0.9%, 0.8%, 0.7%, 0.6%, 0.5%, 0.4%, 0.3%, 0.2%, 0.1%, or 0.05% of the evaporated mass of the carrier fluid is recondensed. For instance, in a particular embodiment, a suitable carrier fluid will exhibit less than about 2% mass lost under the standard vacuum test and less than 0.1% mass recondensed and collected.

Carrier fluids meeting the desirable outgassing properties will have a low vapor pressure. For instance, in some embodiments, the vapor pressure of the carrier fluid is less than about 1 millipascal (mPa) at 25° C., e.g., about 1 mPa, 0.1 mPa, 0.01 mPa, 0.001 mPa, 0.0001 mPa, 0.00001 mPa, 0.000001 mPa, 0.00000001 mPa, 0.000000001 mPa, 0.0000000001 mPa or less at 25° C. In other embodiments, the vapor pressure of the of the carrier fluid is less than about $1\times10^{-6}$ mPa at 25° C. In yet other embodiments, the vapor pressure of the carrier fluid is less than about $1\times10^{-7}$ mPa at 25° C. In still other embodiments, the vapor pressure of the carrier fluid is less than about $1\times10^{-8}$ mPa at 25° C. Carrier fluids with these low vapor pressure characteristics will exhibit greater thermal stability and less outgassing as compared to fluids with high vapor pressure. Suitable carrier fluids include low vapor pressure hydrocarbon fluids, fluorinated polyethers, or combination thereof. Preferably, carrier fluids may be selected from perfluropolyethers (PFPEs) or multiply-alkylated cyclopentanes (MACs). Suitable PFPEs may have a linear or pendant structure. Exemplary PFPEs include K-Type pendent PFPEs, Y-Type pendent PFPEs, D-Type linear PFPEs, M-Type linear PFPEs, and Z-Type linear PFPEs. For example, Z-Type PFPEs are linear PFPEs with the structure $CF_3$—$[OCF_2CF_2]m$-$(OCF_2)n]$ $OCF_3$, such as the commercially available UNIFLOR 8981 (Nye Synthetic Lubricants, Fairhaven, MA, USA) with a vapor pressure of about $9.33\times10^{-6}$ mPa at 25° C. In some embodiments, a carrier fluid suitable for use in the STF fluid is a MAC. As with PFPEs, MAC fluids have high thermal stability and low vapor pressure. Commercially available MACs include the PENNZANE-based RHEOLUBE 2001A (Nye Synthetic Lubricants, Fairhaven, MA, USA) that has a vapor pressure of about $1.33\times10^{-7}$ mPa at 25° C.

The particles may be suspended in the carrier fluid by mechanical mixing, mechanical stirring, or sonication at a concentration of particles from about 40% to about 85% by weight. In some embodiments, the particles are suspended in the carrier fluid at a concentration from about 45% to about 80% by weight of particles. In others, the particle concentration is from about 50% to about 75% by weight. In yet other embodiments, the particles are suspended in the carrier fluid at a concentration from about 60% to about 70% by weight of particles. For instance, in a particular embodiment, about 60 wt % to about 70 wt % monodisperse, spherical silica particles having an average particle size of about 400 nm to about 600 nm are suspended in Z-Type PFPE fluid. In another embodiment, the silica particles are suspended in MAC fluid. In yet other embodiments, the silica particles are suspended in a mixture of PFPE and MAC fluid having a PFPE to MAC ratio of about 0.1 to about 10, e.g., 0.1, 0.5, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, or 10.0. In still other examples, the particles suspended in the PFPE and/or MAC fluid are graphene or clay particles having a spherical or elongated shape and an average particle size range from about 300 nm to about 700 nm. In others, precipitated calcium carbonate particles having an average particle size of less than about 1000 nm are suspended in the PFPE and/or MAC fluid.

The STF fluids described above may be used to dissipate the impact energy and enhance the damage and/or fracture resistance of any material without significantly altering the load carrying properties of the material or significantly increasing the weight of that material. In some embodiments, the STF-composites are comprised of STF interlayers. In such embodiments, the STF fluids are first intercalated into high tenacity fabrics, which are fabrics comprised of high tenacity fibers. These STF-intercalated fabrics are then integrated with the composite materials to create a hybrid STF-composite structure.

STF-Intercalated Textile Layers

In particular embodiments, the STF composites comprise one or more STF-intercalated textile layers, such as an outer layer or an interlayer. To this end, high tenacity fabrics are provided wherein the STF fluid described herein is intercalated into the fabric. The STF-intercalated fabric is then enabled to undergo a shear-thickening transition such that the coefficient of friction between the fibers is increased during an impact event. Thus, when integrated into an STF-composition, the shear-thickening characteristic imparted to the material dissipates the impact energy and confers to the fabric and STF-composite increased strength and resistance to impact damage and fracture. Further, the STF fluid can flow into cracks in the composite material thereby improving the durability against repeated impacts and/or to prevent leakage (e.g., pressure/gas leakage). As noted above, the STF-fluids of the present disclosure do not add significant weight to the fabric. As such, provided herein are STF-intercalated fabrics ideally suited for integration within a composite material for the production of STF-composites.

It is preferred that the STF-intercalated fabrics or textiles be made of high tenacity fibers. As one having ordinary skill in the art would readily appreciate, high tenacity fabrics are fabrics composed of fibers with a high specific strength (tenacity) and high tensile strength. High tenacity fabrics suitable for use herein will comprise fibers with a tensile strength of at least about 100 megapascal (MPa), e.g., 100 MPa, 110 MPa, 120 MPa, 130 MPa, 140 MPa, 150 MPa, 160 MPa, 170 MPa, 180 MPa, 190 MPa, 200 MPa, 210 MPa, 220 MPa, 230 MPa, 240 MPa, 250 MPa, 260 MPa, 270 MPa, 280 MPa, 290 MPa, 300 MPa, 310 MPa, 320 MPa, 330 MPa, 340 MPa, 350 MPa, 360 MPa, 370 MPa, 380 MPa, 390 MPa, 400 MPa, 410 MPa, 420 MPa, 430 MPa, 440 MPa, 450 MPa, 460 MPa, 470 MPa, 480 MPa, 490 MPa, 500 MPa, 510 MPa, 520 MPa, 530 MPa, 540 MPa, 550 MPa, 560 MPa, 570 MPa, 580 MPa, 590 MPa, 600 MPa, 620 MPa, 640 MPa, 650 MPa, 660 MPa, 670 MPa, 680 MPa, 690 MPa, 700 MPa, 710 MPa, 720 MPa, 730 MPa, 740 MPa, 750 MPa, 760 MPa, 770 MPa, 780 MPa, 790 MPa, 800 MPa, 810 MPa, 820 MPa, 830 MPa, 840 MPa, 850 MPa, 860 MPa, 870 MPa, 880 MPa, 890 MPa, 900 MPa, 910 MPa, 920 MPa, 930 MPa, 940 MPa, 950 MPa, 960 MPa, 870 MPa, 980 MPa, 990 MPa, or 1,000 MPa, or more. More preferably, the fibers will comprise high tenacity fibers having a tensile strength of at least about 250 MPa. In other embodiments, fabrics suitable for use herein will comprise fibers with a tensile strength of at least about 1 gigapascal (GPa) and, in some cases, even greater than about 2 GPa, e.g., 2.0 GPa, 2.1 GPa, 2.2 GPa, 2.3 GPa, 2.4 GPa., 2.5 GPa, 2.6 GPa, 2.7 GPa, 2.8 GPa, 2.9 GPa, 3.0 GPa, 3.1 GPa, 3.2 GPa, 3.3 GPa, 3.4 GPa, 3.5 GPa, 3.6 GPa, 3.7 GPa, 3.8 GPa, 3.9 GPa, 4.0 GPa, 4.1 GPa, 4.2 GPa, 4.3 GPa, 4.4 GPa, 4.5 GPa, 4.6 GPa, 4.7 GPa, 4.8 GPa, 4.9 GPa, or 5.0 GPa, or more. Additionally, high tenacity fabrics may comprise fibers having a specific strength of at least about 1,000 kilonewtons meters per kilogram (kN*m/kg). Preferably, the specific strength of the fibers will be at least about 1,500 kN*m/Kg, e.g., 1,500, 1,600, 1,700, 1,800, 1,900, 2,000, 2, 100, 2,200, 2,300, 2,400, 2,500, 2,600, 2,700, 2,800, 2,900, 3,000, 3,100, 3,200, 3,300, 3,400, 3,500, 3,600, 3,700, 3,800, 3,900, 4,000 kN*m/kg. In some embodiments, the specific strength of the fibers will be at least about 2,500 kN*m/kg.

Exemplary fabrics meeting the above criteria are made from fibers that include, but are not limited to, aramid fibers (e.g., para-aramid and meta-aramid), ultra-high molecular weight polyethylene fibers (e.g., SPECTRA or DYNEEMA), polytetrafluoroethylene fibers (PTFE) or expanded/stretched PTFE (e.g., GORE-TEX), polyethylene terephthalate fibers (e.g., DACRON), fibers made from copolymers of paraphenylenediamine and diaminodiphenyl ether (e.g., TECHNORA), aromatic polyester fibers produced by polycondensation of 4-hydroxybenzoic acid and 6-hydroxynapthalene-2-carboxylic acid (e.g., VECTRAN), or any combination thereof. Exemplary aramid fibers suitable for use herein include, but are not limited to, poly-(p-phenylene terephthalamide) (e.g., KEVLAR, TWARON, or HERACRON) and poly-(m-phenylene isophthalamide) (e.g., NOMEX). Some combination fabrics may include orthofabrics comprising a three-beam weave with one surface of ePTFE interwoven into a second surface of poly-(m-phenylene isophthalamide) interlaced with a poly-(p-phenylene terephthalamide) lattice (e.g., a three-beam weave of GORE-TEX, NOMEX, and KEVLAR) or a composite textile comprising a two-beam weave with one surface of ePTFE interwoven into a second surface comprising aromatic polyester fibers produced by polycondensation of 4-hydroxybenzoic acid and 6-hydroxynapthalene-2-carboxylic acid (e.g., a two-beam weave of GORE-TEX and VECTRAN).

In some embodiments, the STF-intercalated fabrics comprise one or more of UHMWPE, PTFE, ePTFE, polyethylene terephthalate fibers, fibers made from copolymers of paraphenylenediamine and diaminodiphenyl ether, aromatic polyester fibers produced by polycondensation of 4-hydroxybenzoic acid and 6-hydroxynapthalene-2-carboxylic acid, poly-(p-phenylene terephthalamide), poly-(m-phenylene isophthalamide), or any combination thereof. In another embodiment, the fabric is made from UHMWPE fibers. In other embodiments, it is an orthofabric. In yet other embodiments, the high tenacity fabric is made from VECTRAN or GORE-TEX fibers. In still others, the STF is intercalated into KEVLAR or NOMEX. The high tenacity fabrics disclosed herein may be constructed using any art-standard textile technique for making fabrics and are typically commercially available. In general, these fabrics may be woven from yarns having a denier from about 25 to about 3,000. In some embodiments, the fabrics are woven from yarns that have a denier from about 100 to about 800. Furthermore, the yarns may be comprised of multiple filaments in the range of 0.1 to 100 denier per filament (dpf); preferably, in the range of 1 to 10 dpf. For instance, VECTRAN is 5 dpf, SPECTRA is 1.5 to 10.8 dpf, and NOMEX and KEVLAR are 1 to 10 dpf.

In some embodiments, a fabric suitable for use herein is chosen based on its ability to absorb radiation. While not intending to be bound by theory, fibers having high hydrogen content (e.g., at least a 2 to 1 ratio of hydrogen to carbon) are believed to exhibit desirous radiation absorption characteristics. An exemplary high tenacity fabric with desired radiation absorption is a fabric comprising UHMWPE fibers.

The STF fluid may be intercalated into the fabric by a dip coating and padding technique. The STF fluid is first diluted in volatile diluent fluid, such as an alcohol (e.g., ethanol, methanol, isopropyl alcohol, etc.), at a volumetric ratio that ranges from about 1:1 diluent to STF fluid to about 10:1 diluent to STF fluid, e.g., 1:1, 1.5:1, 2:1, 2.5:1, 3:1, 3.5:1, 4:1, 4.5:1, 5:1, 5.5:1, 6:1, 6.5:1, 7:1, 7.5:1, 8:1, 8.5:1, 9:1, 9.5:1, or 10:1 volumetric ratio of diluent to STF fluid; preferably between about 1:1 to about 4:1 diluent to STF fluid. The fabric is then dipped into the diluted STF fluid for a period of time. In some embodiments, the period of time is at least about 10 seconds. In other embodiments, the period of time is at least about 30 seconds, e.g., 30, 35, 40, 45, 50, 55, 60, 65, 70, 75, 80, 85, 90, 95, or 100, or more seconds. In other embodiments, the period of time is at least 1 minute. In some embodiments, the diluted STF fluid is contained in an agitated bath such that when the fabric is dipped in the agitated bath, the agitation aids with the intercalation of the diluted STF fluid into the fabric. It is desired that the STF fluid be distributed uniformly throughout the fabric. Further, as increasing amounts of STF fluid has diminishing returns, excess STF fluid should be removed to avoid adding weight to the fabric. To this end, once the fabric is dipped in the diluted STF fluid, it can be squeezed through a set of rollers to remove excess fluid and control uptake of the STF fluid in the fabric. As one skilled in the art would appreciate, this technique is known in the textile industry as a padding process. The STF-intercalated fabric is then dried using any convention means (e.g., an oven) to remove the volatile diluent fluid. The time and temperature of the drying step may vary depending on the specifics of the materials used, such as the vapor pressure of the volatile fluid and the time and temperature required to optimize the removal of the diluent without damaging the fabric or carrier fluid. In some embodiments, the drying step is carried out between about 50° C. and 100° C.; preferably, the temperature is between about 60° C. and 80° C. The drying time can be from about 10 minutes to about 2 hours or more, e.g., 10 min, 20 min, 30 min, 40 min, 50 min, 60 min, 70 min, 80 min, 90 min, 100 min, 110 min, 120 min or more.

Thus, the STF-fluids can be intercalated into high tenacity fabrics to confer to the fabrics increased strength and energy dissipation as compared to untreated, or neat fabric without adding significant weight to the fabric or decreasing the structural rigidity of the fabric. Therefore, the STF-intercalated fabrics provided herein are also light weight and capable of conforming to complex geometric shapes making them suitable for a variety of uses. In some embodiments, the STF fluid causes a weight increase of the STF-intercalated fabric as compared to the equivalent neat fabric, where the weight increase is less than about 40%. In other embodiments, the weight increase is less than about 35%, e.g., 35%, 34%, 33%, 32%, 31%, 30%, 29%, 28%, 27%, 26%, 25%, 24%, 23%, 22%, 21%, 20%, 19%, 18%, 17%, 16%, 15%, 14%, 13%, 12%, 11%, 10%, 9%, 8%, 7%, 6%, 5%, 4%, 3%, 2%, or 1%. In some embodiments, the weight increase is less than about 30%. In others, it is less than about 20%. In yet others, the weight increase is equal to or less than about 15%.

STF-Composite Construction

The STF-composites of the instant disclosure include any combination of the above-described STF fluids, STF-intercalated textiles, and/or composite materials. For instance, an STF-composite may comprise one or more S-glass and/or carbon fiber composite layers with an integrated STF layer, such as a high tenacity textile intercalated with STF fluid. As noted above, the STF-intercalated textile may comprise a plurality of aramid fibers (e.g., KEVLAR or NOMEX), UHMWPE fibers (e.g., SPECTRA or DYNEEMA), ePTFE (e.g., GORE-TEX), and the like, and the STF fluid may be formulated with, e.g., monodisperse or polydisperse silica suspended in PFPE or MAC carrier fluid. It is preferable that the STF-composite design be capable of any number of geometrical shapes and structures. In such embodiments, the STF-composite structure itself can be assembled in several suitable arrangements.

For instance, in one embodiment, the STF-composite is a "sandwich" design comprising one or more STF-intercalated textile interlayers disposed between composite layers. An STF-composite interlayer structure may be desirable to impart enhanced leak-sealing capabilities to the composite material. A non-limiting exemplary embodiment of the interlayer design is diagrammatically represented in FIG. 1A (top). As shown in FIG. 1A, the STF-composite interlayer design 10 comprises an STF-intercalated textile interlayer 20 that is disposed between two composite members 30, 40. Additionally, each composite member may comprise a single composite layer or multiple composite layers, and each composite member may comprise the same number of composite layers or different numbers of composite layers. In some embodiments, the composite member comprises at least 1 composite layer, e.g., 1, 2, 3, 4, 5, 6, 7, 8, 9, 10, 11, 12, 13, 14, 15, or more composite layers. In other embodiments, a composite member comprises at least 2 composite layers. In other embodiments, a composite member comprises at least 10 composite layers. In yet others, a composite member comprises between 1 and 15 composite layers.

Figure 4:
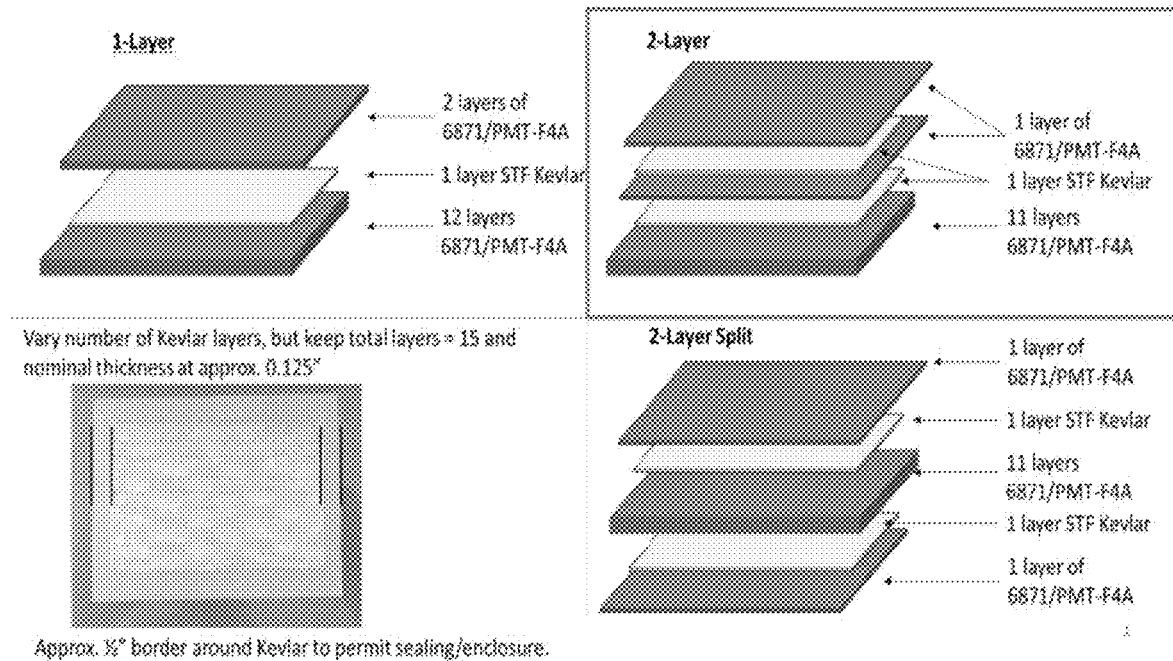
FIG. 4 depicts several embodiments of the STF-composite design and include a 1-STF-layer lay up (top-left panel), a 2-STF-layer lay up (top-right panel), and a 2-STF-layer split lay up (bottom-right panel). The lower-left panel shows test specimens that were fabricated with KEVLAR layers that were slightly smaller than the S-glass to create an approximate 12 mm (½ in.) border around the sample to fully enclose the STF-intercalated layers.

In the non-limiting embodiment depicted in FIG. 1A, the STF-composite interlayer design 10 comprises one STF interlayer 20 and each of the composite members 30, 40 comprises one or more composite layers. However, other STF-composite structures suitable for use herein have more than one STF interlayer. In some embodiments, the STF-composite may have two or more STF interlayers, each of which is disposed between two composite members. In such embodiments, each of the composite members may comprise one or more composite layers. For instance, in one non-limiting embodiment, the STF-composite is an interlayer design with a first composite member composed of 1-15 layers of composite, 1 STF interlayer, and a second composite member composed of 1-15 layers of composite. In another embodiment, the STF-composite comprises a first composite member composed of 1-15 layers of composite, a first STF interlayer, a second composite member composed of 1-15 composite layers, a second STF interlayer, and a third composite member comprising a single outer composite layer. Exemplary STF-composite interlayer assembly structures are described in FIG. 4. For instance, an STF-composite layup may include, from bottom to top, a first composite member of 11 S-glass composite layers, a single STF interlayer of STF-intercalated KEVLAR, a second composite member comprising a single S-glass composite layer, another single STF interlayer of STF-intercalated KEVLAR, and a top composite member comprising a single S-glass composite layer.

The different layers of the STF-composites are typically held together by an adhesive. In some applications, STF-composites require high modulus, high-temperature resistance, chemical resistance, and/or moisture resistance. Thus, it may be desirable to select high performance adhesives for the STF-composite assembly. Suitable adhesives are known in the art and may include epoxy resin adhesives and/or polyurethane adhesives, methacrylate, cyanoacrylate, silicone, acrylic, natural or synthetic rubber-based adhesives. Often, the adhesive holding the layers together includes the same type of resin reinforcing the composite layer matrix. In some embodiments, one or more additives are combined with the adhesive to reduce brittleness or hardness of the adhesive and prevent cracking or delamination of the composite under harsh conditions. For instance, in some embodiments, toughened epoxy resin adhesives are desired in which acrylates or plasticizers are added to the epoxy resin. The STF-composites can then be assembled and cured by any art standard means. For instance, in one embodiment, the composite layers and STF interlayers are assembled in the desired order and then pressed and rolled to consolidate the layers, promote adhesion, and remove air. In still another embodiment, the adhesive may be conductive and suitably integrated to enable structural health monitoring and/or damage-sensing capability. The completed STF-composite structures are then processed to cure the epoxy resin. While some epoxy resins can be cured at ambient temperature, many require heat. Thus, in some embodiments, the STF-composite resins are cured via oven baking or hot press at cure temperatures ranging from about 100° C. to about 150° C.

Typical resin content is in the range of about 20% to about 40% by weight, preferably between about 30% to about 35% by weight. In some methods of assembly, thin sheets of composite materials (e.g., S-glass or carbon fiber) pre-impregnated with resin (such as with about 30% to about 40% wt toughened epoxy resin) are laid up with STF interlayers, molded to the desired shape, and then heat cured. Pre-impregnated composites are often referred to as "pre-pregs" and are commercially available. Thus, the STF-composite structures described herein can be easily assembled for any desired application.

The STF-composite interlayer design can dissipate both moderate and severe impact energy to prevent damage to the surrounding composite layers as well as to prevent cracking or fracture through the thickness of the composite. Moreover, the STF component imparts reduction/prevention of leakage through the STF-composite structure, which is a particularly useful attribute for pressure and/or liquid containment applications (e.g., EMU suits). As shown in FIG. 1B, the STF-composite interlayer design 10 exhibits enhanced impact-resistance and damage tolerance in response to both moderate impact energy and severe impact energy. As the moderate impact $I_1$ applies a force $F_1$ to the top composite member 30, the STF in the STF interlayer 20 shear thickens to dissipate the impact energy and additionally self-heals after impact. For a severe impact $I_2$ with increased $F_2$ applied to the top composite member, the STF shear thickens to dissipate the impact energy and can also flow into any cracks 50 formed in the composite due to the impact. Thus, the self-healing ability of the STF-composite imparts to the structure improved durability against repeated impact and additionally prevents leakage of liquid or gas through the STF composite.

In an alternative embodiment, an STF-intercalated fabric layer is disposed on the outer surface of the composite thereby forming an external STF energy-absorbing layer. As shown in FIG. 1A, the STF-composite 60 includes a composite member 80 on which is disposed one or more STF-intercalated textiles forming an external layer 70. In this embodiment, the external STF layer can take the form of an STF packet, an STF-intercalated foam material, or an STF-intercalated textile layer. The STF packet consists of STF integrated into spacer fabric having the desired thickness which is then sealed within a polymeric film covering using vacuum sealing or similar. The STF-composite can be easily constructed using art standard methods, such as those described above for the STF-composite interlayer design. In the STF-outer layer design, the external STF-intercalated textile can act as a seal to prevent pressure/gas leakage. This design will provide durability to repeated, low-energy impacts with enhanced tolerance to moderate and severe impacts as the external STF-intercalated textile dissipates the impact energy thereby decreasing damage to the composite material.

In yet another embodiment, the STF material is distributed throughout the composite material to form a reinforcement matrix. Depicted in FIG. 1A is a non-limiting embodiment of an STF-composite 90 in which the STF material 100 is dispersed into a resin, which is then subsequently infused into the composite material 110. In still other designs, the STF material is disposed within a reservoir or window within the composite in an "open window" design. In such embodiments, the STF fluid or a fabric soaked in STF fluid is encapsulated by or encased by the composite material (see, e.g., FIG. 13).

The STF-composite designs described herein can be built to withstand a low velocity impact energy of at least about 100 J, e.g., 100 J, 110 J, 120 J, 130 J, 140 J, 150 J, 160 J, 170 J, 180 J, 190 J, 200 J, 210 J, 220 J, 230 J, 240 J, 250 J, 260 J, 270 J, 280 J, 290 J, 300 J, 310 J, 320 J, 330 J, 340 J, 350 J, 360 J, 370 J, 380 J, 390 J, 400 J, or more (as tested with a 2 inch steel impactor as described in ASTM D-7136, or other suitable low velocity impact test). In some embodiments, the STF-composite designs described herein can be built to withstand a low velocity impact energy of at least about 200 J; preferably, of at least about 250 J. In some embodiments, the STF-composite designs described herein can be built to withstand a higher velocity impact energy of at least about 300 J.

In addition to their ability to withstand impact energies, the STF-composites provided herein are also light weight with a structural density of less than about 3 $g/cm^3$, e.g., 3 $g/cm^3$, 2.9 $g/cm^3$, 2.8 $g/cm^3$, 2.7 $g/cm^3$, 2.6 $g/cm^3$, 2.5 $g/cm^3$, 2.4 $g/cm^3$, 2.3 $g/cm^3$, 2.2 $g/cm^3$, 2.1 $g/cm^3$, 2.0 $g/cm^3$, 1.9 $g/cm^3$, 1.8 $g/cm^3$, 1.7 $g/cm^3$, 1.6 $g/cm^3$, 1.5 $g/cm^3$, 1.4 $g/cm^3$, 1.3 $g/cm^3$, 1.2 $g/cm^3$, 1.1 $g/cm^3$, 1.0 $g/cm^3$, or less. Preferably, the STF-composite will have a structural density of less than about 2.0 $g/cm^3$. In preferred embodiments, the STF-composite structures are also thin relative to other materials with similar damage resistant properties. In these embodiments, the STF-composite will have a thickness of less than about 0.5 in. (1.27 cm), e.g., 0.5 in. (1.27 cm), 0.4 in. (1.02 cm), 0.3 in. (0.76 cm), 0.2 in. (0.51 cm), 0.19 in. (0.48 cm), 0.18 in. (0.46 cm), 0.17 in. (0.43 cm), 0.16 in. (0.41 cm), 0.15 in. (0.38 cm), 0.14 in. (0.36 cm), 0.13 in. (0.33 cm), 0.12 in. (0.31 cm), 0.11 in. (0.28 cm), 0.10 in. (0.25 cm), or less. Preferably, the STF-composite will have a thickness of less than about 0.2 in. (0.51 cm). For instance, in a particular embodiment, the STF-composite has a structural density of less than about 1.7 $g/cm^3$ and a thickness of less than about 0.125 in. (0.318 cm).

Uses of STF-Composites

The STF-composites provided herein are suitable for a variety of applications for which a structure with impact-resistant characteristics is desired. Moreover, the incorporation of STF into the composite structure enhances the impact and damage resistant properties of the composite without adding significant weight. The STF-composites provided herein can be made from light weight, but high tenacity composite materials, such as glass fibers or carbon fibers that can further be molded/fabricated in complex geometries making the instant STF-composite materials suitable for use in aircraft, marine vessels, safety equipment (e.g., sports helmets), sporting goods (e.g., surfboards, snowboards, skate boards, skis, hockey sticks, hockey skates, and lacrosse sticks), and space suits. The self-healing properties of the instant STF-composites also illustrate the utility of these materials in storage and air tanks and in the hard upper torso (HUT) component of environmental protection garments (EPGs) used for space travel.

In a particular embodiment, the STF-composite materials are used to construct the HUT component of an EMU safety suit that exhibits increased resistance to low, medium, and even severe impact. Conventional EMU suits currently available for Extra-Vehicular Activity (EVA) are comprised of a HUT and soft fabric mobility joints. The existing HUT includes a fiberglass HUT. However, the thickness of the fiberglass HUT needed to resist impact damage makes the suit quite heavy and unsuitable for extraterrestrial exploration where the wearer would be required to operate for extended periods of time on terrain with significant gravity, such as the Martian landscape. The HUT of the NASA's Z-2 suit comprises a combination of carbon fiber and S-glass composite, but still may not withstand severe impacts or repeated low energy impacts to provide the wearer with the protection necessary to operate for extended periods of time on Mars. As such, the present STF-composites can be used to replace the composites currently used in HUT technology to provide a durable, damage-tolerant, lightweight pressure structure capable of withstanding low velocity impacts. For instance, an STF-composite comprised of a first composite member that includes 10 or 11 composite layers (carbon fiber and/or S-glass), an STF-KEVLAR layer, another composite layer, a second STF-KEVLAR layer, and an outer composite layer (see, e.g., FIG. 4) can be designed to withstand a low velocity impact of at least about 300 J while having a structural density of less than about 1.7 $g/cm^3$ and thickness of less than about 0.125 inches. The HUT constructed from the STF-composites disclosed herein can be used in combination with a thermal micrometeoroid garment (TMG) comprising STF-intercalated fabrics, such as those described in U.S. Patent Application No. 62/694,837 entitled, HIGH TENACITY TEXTILES CONTAINING SHEAR THICKENING FLUID AND USES THEREOF, the entire contents of which are incorporated herein by reference. Accordingly, an EMU can be constructed that includes a STF-composite HUT over which is laid a TMG.

For instance, in one embodiment, a HUT is constructed from an STF-composite that includes an inner composite member comprising 11 S-glass (or S-glass/carbon fiber hybrid) layers, an STF-KEVLAR layer, another S-glass layer, a second STF-KEVLAR layer, and an outer S-glass layer. The damage tolerant STF-composite will confer to the HUT the capability to withstanding low velocity impacts of 300 J, while having a structural density of less than about 1.7 $g/cm^3$ and thickness below about 0.125 inches.

The following examples describe the invention in greater detail. They are intended to illustrate, rather than to limit, the invention.

Example 1. Materials and Methods

STF-KEVLAR Construction

Two STF fluid formulations were produced in carrier fluids that included polyethylene glycol 200 or phenyl-modified silicone fluid. Briefly, silica particles were suspended in the carrier fluid at a concentration of about 67% by weight of silica particles. The STF fluid was diluted with 200 proof ethanol in a 1:1 ethanol to STF volumetric ratio and intercalated into a 17 by 17 plain weave KEVLAR fabric having a denier of 1,140, a thickness of about 10 mil, and a weight of about 170 $g/m^2$. The KEVLAR fabric was immersed in a bath containing the diluted STF fluid for 1 minute and then compressing with nip rollers, whereby the STF fluid was intercalated into the fabric (i.e., the STF fluid was located between fibers within yarns and is not a typical surface coating). The ethanol diluent was evaporated at 70° C. for 1 hour. The STF carrier fluid properties are shown in Table 1.

TABLE 1

STF Carrier Fluid Properties

| Fluid | Density (kg/m$^3$) | Viscosity @ 25° C. (mPa*s) | Hydrophilic/ Hydrophobic | Flash Point (° C.) |
|---|---|---|---|---|
| PEG 200 | 1,120 | 60 | Hydrophilic | 190 |
| Phenyl Silicone | 1,010 | 20 | Hydrophobic | 275 |

Kg, kilogram; m$^3$, cubic meter; mPa*s, millipascal-second.

Composite Material

For the composite material component, 6781 S-Glass/PMT-F4A resin prepregs (S-glass composites impregnated with toughened epoxy resin) were used for the fiberglass layers (Patz Materials and Technologies, Benicia, CA, USA). The 6781 S-glass composite was a 300 g/m$^2$ 8 harness satin weave (originally manufactured by Hexcel Corporation, Stamford, CT, USA), and the resin content was about 30.6% by weight. Two other types of prepregs were tested, each composed of a 8 harness satin weave of E-glass fibers-PP-50 E-glass/toughened epoxy and 7781 E-glass/toughened epoxy (ACP Composites, Livermore, CA, USA). For each of these prepregs, the resin content was about 30%. Table 2 provides a comparison between the 6781 S-Glass/PMT-F4A resin prepreg and the 7781 E-glass/toughened epoxy resin prepreg.

TABLE 2

STF Carrier Fluid Properties

| prepreg | Fabric Dry Weight (g/m$^2$) | Fiber | Construction (Warp × Fill per inch) | Yarn | Thickness |
|---|---|---|---|---|---|
| Patz 6781/PMT-F4A | 302 | S-2 Glass | 57 × 54 | US: SCG 75 1/0 SI: SC9 68 | 9.5 mil (0.24 mm) |
| ACP 7781 8H satin E-glass/epoxy | 299 | E-Glass | 57 × 54 | US: ECDE 75 1/0 SI: EC6 66 | 8.6 mil (0.22 mm) |

SCG, S-glass of continuous filaments having a filament diameter designation G (i.e., about 9 microns);
ECDE, E-glass of continuous filaments having a filament diameter designation DE (i.e., about 6 microns);
mm, millimeter;
g/m$^2$, grams per square meter.

Composite Construction

Composite panels of the STF interlayer design were constructed by hand lay up of prepregs using a 0/90/0 orientation. Fifteen layers were used to achieve a nominal thickness of approximately 0.125 in. (3.18 mm). The discrete number of layers and different thicknesses of the STF-KEVLAR layers and S-glass layers led to a slight, unavoidable thickness variation as the number of STF-KEVLAR layers was varied. During the placement of each layer of the lay-up, the prepreg was pressed and rolled to consolidate the layers, promote adhesion, and remove air between layers. The completed lay-ups were then cured as flat panels using a hot press. A pressure of 83 psi (2000 lbs total) was applied by the press. The prepregs were cured using a temperature ramp to 250° F. (121.1° C.) at a ramp rate of 5° F. (2.8° C.) per minute. The panels were allowed to cure at 250° F. (121.1° C.) for 2 hours. After 2 hours, the temperature was ramped down to 150° F. (65.6° C.) and the panels were removed from the press. The specimens were cut to size and edges finished by light sanding. A two-hour post-cure at 250° F. (121.1° C.) in an oven was used to ensure complete curing of the epoxy.

Impact Testing

Impact tests were performed on an Instron Dynatup 9200 drop weight impact tower at the Center for Composite Materials at the University of Delaware. The impact tup had a 2 inch diameter spherical strike surface. Initial testing was conducted using a drop mass of 13.134 kg. Sample impact-resistance testing was performed using drop heights corresponding to 100 J, 125 J, and 150 J of impact energy. Material property characterization tests for modeling used drop heights of 10 cm, 20 cm, and 30 cm, which corresponded to approximately 13 J, 26 J, and 39 J of impact energy, respectively. The sample holder was based on the dimensions of ASTM D-7136, which holds a 100 mm×150 mm (4 in. x 6 in.) specimen. The specimen was supported on top of a window that had dimensions of 75 mm×125 mm (3 in. x 5 in.) The holder was slightly modified with a top plate that provided a perfectly clamped boundary condition that was needed to accurately correlate model and experimental results. The opening in the top plate was originally 2 in., but was enlarged to 3 in. diameter to accommodate the testing of STF-intercalated outer layers. There was no modification to the sample backing versus ASTM D-7136. The actual impact velocity was measured by a photodetector and flag system, and the impact force was measured by a 5,000 pound (force) (lbf) load cell on the impactor head. The maximum test impact energy was limited to 150 J due to limitations of existing ASTM standard test methods and fixtures. Edge and support effects dominated the sample response as energy was increased beyond 150 J. These effects were especially pronounced for the STF-composites, which were effective at distributing impact loading over a larger area. The Instron Dynatup 9200 drop weight impact tower with the modified sample holder is shown in FIG. 2.

Leak Testing

The ability of the STF-composites to retain pressure after impact was tested using a custom-built leak testing apparatus that was based studies on leakage after impact for composite materials as described in Nettles, 2003, NASA Marshall Space Flight Center, the entire content of which is incorporated herein by reference. The impacted composite specimen was clamped between gaskets with the impacted face oriented up, and a pressure was applied behind the sample. Testing of STF-composite materials was conducted at 8.2 psi to emulate the anticipated pressure of an exploration extravehicular mobility unit (xEMU) suit. Leaks were detected by placing a water/ethylene glycol solution on top of the composite and observing whether any bubbles were formed. An exemplary illustration of the leakage detection system is shown in FIG. 3.

Example 2. STF-Composite Layer Designs

A number of different designs for incorporating STF into impact-resistant composites were constructed according to the procedure described in Example 1. The STF-composite design samples were subjected to various tests as described in the following Examples. For instance, one exemplary design exhibiting superior impact resistance was a design containing 15 total layers consisting of the following stacking sequence from outermost layer (strike face) to innermost layer (rear lamina): 1 layer S-glass prepreg, 1 layer STF-KEVLAR, 1 layer S-glass prepreg, 1 layer STF-KEVLAR, and 11 layers of S-glass prepreg (see FIG. 4). A parametric study was performed to test the effects of the number of STF layers and the type of STF particle on the impact resistance of the STF-composite structures. The different designs tested in the parametric study are listed in Table 3. The designs were coded M2 through M12. The control sample was 15 layers of the Patz S-glass/PMT-F4 prepreg and was designated as M1.

TABLE 3

STF-Composite Lay Up Designs

| Design Code | Number of STF-KEVLAR Layers | STF Particle | Other |
|---|---|---|---|
| M1 | 0 | — | |
| M2 | 1* | — | *KEVLAR layer untreated |
| M3 | 1 | Polydisperse Silica | |
| M4 | 2 | Polydisperse Silica | |
| M5 | 2 | Polydisperse Silica | 2-layer split design |
| M6 | 2* | Polydisperse Silica | *KEVLAR layer untreated |
| M7 | 2 | Calcium Carbonate | |
| M8 | 3 | Polydisperse Silica | |
| M9 | 4 | Polydisperse Silica | |
| M10 | 2 | Monodisperse Silica | |
| M11 | 3 | Monodisperse Silica | |
| M12 | 4 | Monodisperse Silica | |

Figure 5:
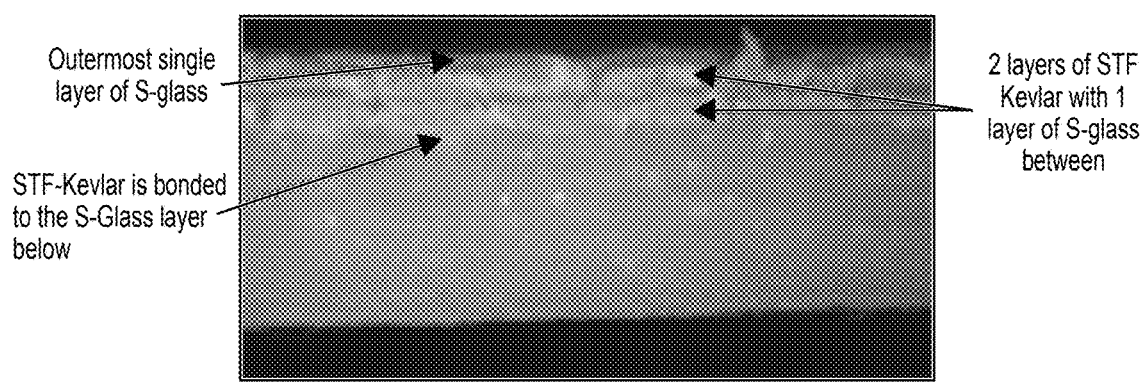
FIG. 5 is an image of an STF-composite material test specimen cross-section (after 100 J impact) showing good bonding between STF-KEVLAR and glass layers.

Samples were cut and inspected to test the bonding between the STF-KEVLAR and the S-glass prepreg layers. As shown in FIG. 5, the S-glass prepreg bonded to the surface of each STF-KEVLAR layer after an 100 J impact. The tests showed that the layers were securely bonded and not easily separated when the KEVLAR contained STF. The samples with untreated KEVLAR were able to be delaminated, a result attributed to the void space between fibers/yarns in the untreated KEVLAR creating a resin-lean region at the interface. Untreated KEVLAR-containing samples also had significantly poorer impact properties as compared to the STF-KEVLAR-containing specimen. In the STF-composite samples, the STF filled the void space between fibers, preventing creation of the resin-lean region and ensuring good bonding between the STF-KEVLAR and S-glass layers.

Example 3. Impact of STF-Composites with 2 STF-KEVLAR Layers

Figure 6:
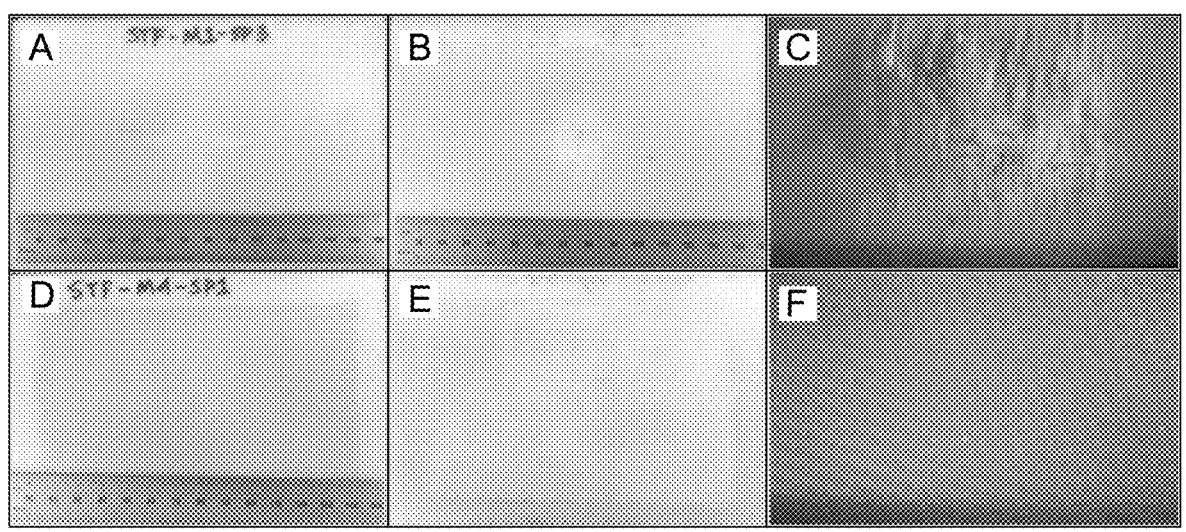
FIG. 6 shows the results of a 100 J impact test on control versus STF-composite materials. Panels A (specimen front), B (specimen back), and C (micrograph of rear lamina) show the results for the control S-glass M1 composite specimen, and panels D (specimen front), E (specimen back), and F (micrograph of rear lamina) show the results for the 2-STF-layer M4 composite specimen.

Impact testing was performed at 100 J of impact energy on the all S-glass (M1) and the 2-layer STF-composite (M4). The results of the impact testing are shown in FIG. 6. The M1 panel sustained impact face cracks and significant rear lamina fracture. Some delamination was also visible near the impact area. The M1 specimen failed the leak test, indicating that it sustained damaged through the thickness of the composite. The result was consistent with previously published results by Ross et al. [44$^{th}$ International Conference on Environmental Systems 13-17 (2014)], the entire contents of which are incorporated herein by reference, which found that rear lamina fracture occurred for low velocity impact testing at 70 J on a panel made from the same Patz prepreg with the same thickness as the MI specimen. In contrast, the M4 STF-composite did not have rear lamina fracture at 100 J. Very minor cracking was observed on the impact face, and some slight delamination was observed. There was some deformation near the edge of the specimen support, indicating that the addition of the STF-KEVLAR layers was effective at engaging the bulk of the specimen area during impact.

Figure 7A:
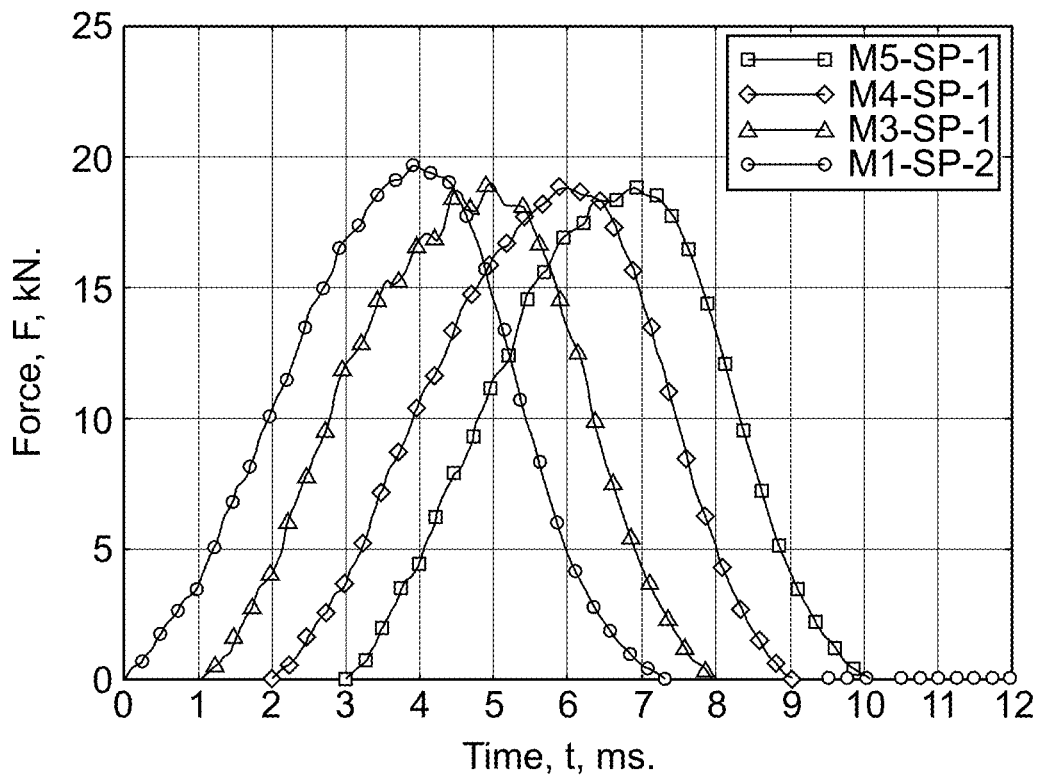
FIG. 7A is a graph depicting force-time curves for the M1 control as compared to three different STF-composite lay-ups (M3, M4, and M5). The y-axis represents the amount of force in kilonewtons (kN), and the x-axis represents the time in milliseconds (ms).
Figure 7B:
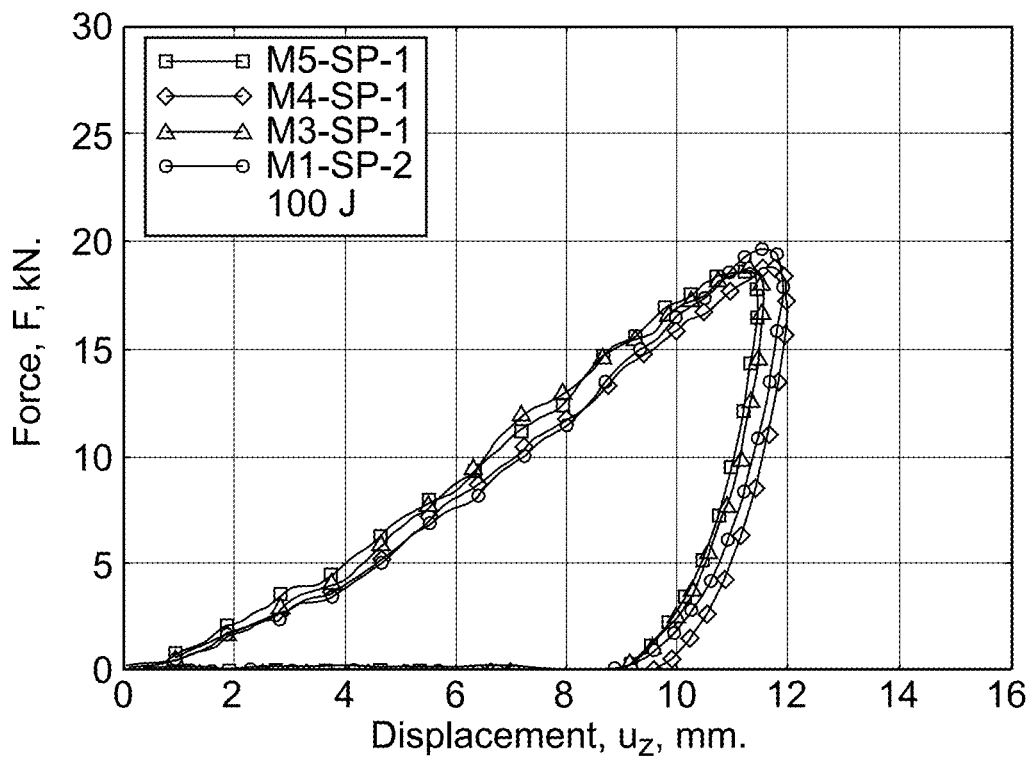
FIG. 7B is a graph depicting force-displacement curves for the M1 control as compared to three different STF-composite lay-ups (M3, M4, and M5). The y-axis represents the amount of force in kilonewtons (kN), and the x-axis represents the displacement in millimeters (mm).

Despite the disparity in impact damage seen with the M4 STF-composite as compared to the M1 S-glass composite control, the force-time and force-displacement curves from the impact were very similar for the two materials. These curves are shown in FIGS. 7A and 7B, along with curves for the M3 (1 STF-Kevlar Layer) and M5 (2 layers split) designs. The curves had similar shapes, peak forces, and peak displacements. The peak force for M1 was 19.7 N whereas the peak force for M4 was 4% lower at 18.9 N. Thus, the addition of STF-KEVLAR slightly reduced the apparent modulus during impact, but the damage to the rear lamina is substantially less for the STF-containing design.

Figure 8:
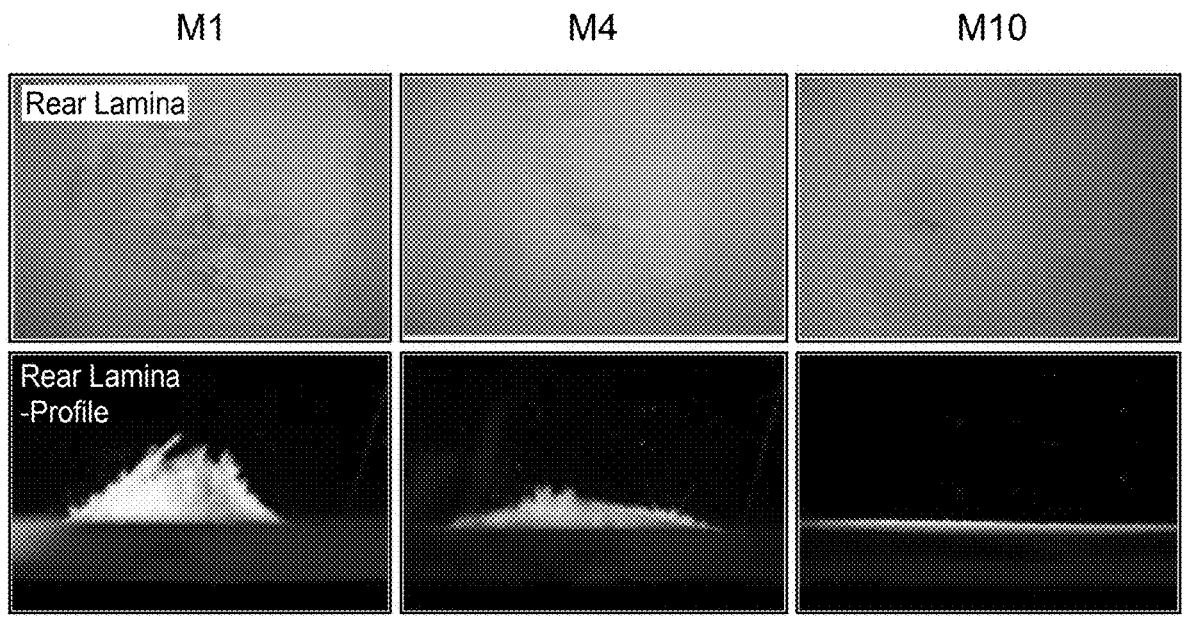
FIG. 8 are stereomicrograph images showing the damage sustained by the composite materials from a 150 J impact. The top row depicts rear lamina images of the M1 S-glass control composite (left panel) as compared to the M4 STF-composite (center panel) and M10 STF-composite with optimized STF formulation (right panel). The bottom row depicts lamina profile images of the M1 S-glass control composite (left panel) as compared to the M4 STF-composite (center panel) and M10 STF-composite with optimized STF formulation (right panel).
Figure 9:
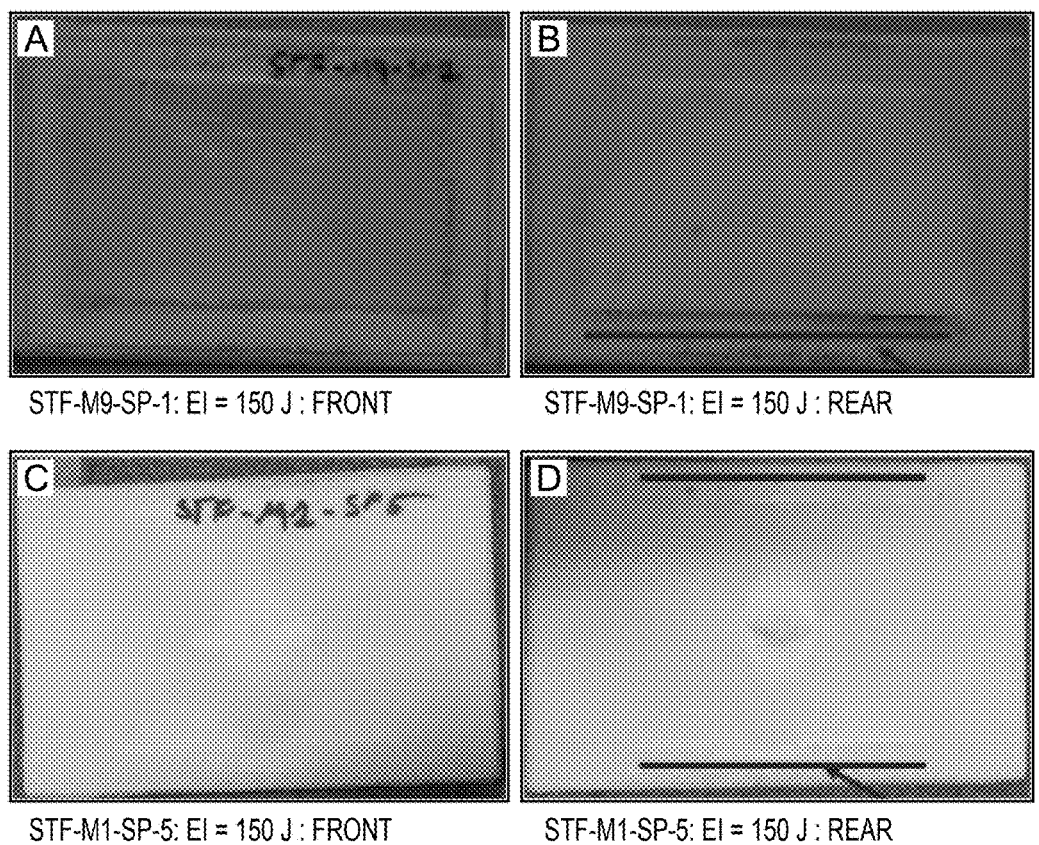
FIG. 9 is an illustration of the edge effects and stress localization on a composite sample during a 150 J impact using the ASTM D-7136 fixture with standard specimen size. The 4-layer STF-composite front image (panel A) and rear image (panel B) are compared to the M1 S-glass composite front image (panel C) and rear image (panel D). The 4-layer STF-composite sample withstood the impact without fracture of the rear lamina in the impact zone, but did have deformation and damage along the support edge due to stress concentration and a "punch-out" effect. The conventional M1 S-glass composite specimen had both through thickness damage in the impact zone and cracking along the edges that indicate specimen support effects.

The results of impact testing at 150 J are illustrated in FIG. 8, which shows the M1, M4, and M10 panels. The M4 and M10 panels were identical in construction, except that the M4 comprised a polydisperse silica particle in the STF and the M10 used a monodisperse silica particle in the STF. As shown in FIG. 9, the M1 S-glass panel was severely damaged following a 150 J impact, as evidenced by the substantial rear lamina fracture and fiber protrusion visible in the profile view. In addition, the M1 S-glass panel failed the leak test (see FIG. 10). In contrast, the M10 STF-composite panel with the monodisperse silica formulation had some localized deformation, but no fibers were observed protruding in the profile image (see FIG. 8) and the specimen passed the leak test (see FIG. 10). For the M4 STF-composite panel, there was some localized rear lamina fracture and fiber protrusion observed, but the specimen remained intact and passed the leak test (see FIGS. 8 and 10). Despite the presence of rear face damage, the retention of the pressure-carrying capability demonstrates that the STF-composites provided herein are particularly suitable for damage-tolerant structures for use in EPGs, such as space suits. By maintaining pressure-barrier integrity even after a severe impact, the STF-composites would provide the crewmember with a significant, additional margin of safety to allow return to the vehicle or habitat.

Additional testing revealed that some of the STF-composite specimens sustained minor edge damage due to the current ASTM D-7136 method and fixture design when exposed to 150 J of impact energy. However, rather than due to any structural weakness of the STF-composite, the edge damage resulted mainly because of the ability of the STF to spread the impact, which resulted in an impact force that was transmitted to the edge of the specimen. Moreover, the sharp transition between supported and unsupported conditions near the edge of the fixture concentrated the stress and caused a line of damage along the support edge. FIG. 9 shows one such example where the panel remained intact and was not damaged through the thickness of the composite, but was instead "punched out" as the edge of the fixture acted as a die. Similar edge/specimen support effects were also observed for M1 S-glass composite panels that also sustained through thickness damage. Because of this edge effect, the maximum impact test energy was limited to 150 J with this study design. Nonetheless, as one having ordinary skill in the art would readily appreciate, STF-composite edge damage in the absence of significant damage through the thickness of the composite near the point of impact was an artifact attributed to the limitations of the test method employed.

Example 4. Parametric Study

A parametric study was performed in which the number of STF layers, the arrangement of those layers, and the STF formulation particle phase were varied. Impact testing was performed on all targets at 150 J of impact energy. All samples were photographed, inspected for damage, and subjected to leak testing after impact. As noted above, the M1 S-glass composite control failed at energies as low as 100 J. STF-composites made with the final monodisperse silica formulation (M10, M11, and M12) did not have rear lamina fracture and did not fail the leak test in any of the tests on samples containing 2-, 3-, or 4-layer STF-KEVLAR designs. Samples made with the polydisperse silica formulation (M4, M8, and M9) withstood 100 J of impact without rear lamina damage or leakage, but did exhibit some rear lamina fractures at 150 J. However, none of the polydisperse silica STF-composites leaked after impact and did not exhibit significant through-thickness damage in the impact zone. The ability to prevent leakage, even with rear lamina damage illustrated the secondary sealing properties of the STF. The impact alteration of the STF functions to maintain integrity of the top layers of the composite even when the lowest layers are fractured. One 4-layer specimen (M9-SP2) had edge fracture of the type shown in Figure FIG. 9 that cracked through the thickness near the edge and allowed leakage. A calcium carbonate STF formulation was also tested in an STF-composite, which revealed that the STF-composites containing the silica particles exhibited better impact and leak resistance as compared to the STF-composites containing the softer calcium carbonate particles.

Figure 10:
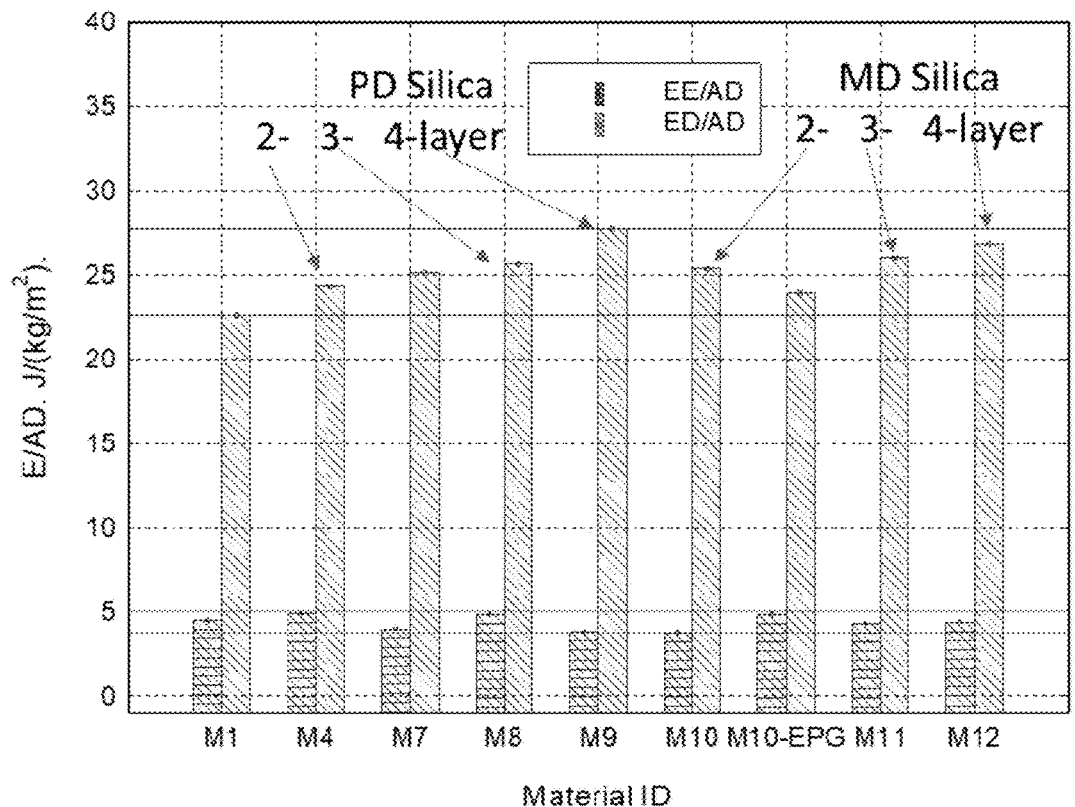
FIG. 10 is a graph depicting the specific energy dissipation during impact. As the number of STF-layers in the STF-composite was increased, the specific energy dissipation during impact also increased. The M1 S-glass composite (which had lower energy dissipation) sustained rear lamina fracture and leakage. None of the STF-composites leaked in the 150 J impact testing. The M10-EPG sample is the high friction EPG test described in Example 5. The y-axis represents energy per areal density, whereas the x-axis represents the specimen tested. EE/AD, elastic energy per areal density; ED/AD, energy dissipated per areal density.

Increasing the number of STF layers in the STF-composite generally increased the specific energy absorption, as shown in FIG. 10. Substantial overall differences were not observed among the monodisperse silica specimens, as none of the samples fractured or leaked. Total impact deflection also increased with increasing number of STF layers, which is attributed to the reduction in stiffness as the S-glass layers that are completely cured in epoxy are replaced with the STF-Kevlar, which has a portion of the interstitial space filled with STF and is more flexible. The results of the parametric STF-composite design study and impact testing are summarized in Table 4.

TABLE 4

Impact and Leak Testing Summary.

| Description | Sample ID | Impact Energy | Leak | Rear Lamina Fracture |
|---|---|---|---|---|
| S-Glass composite Control | M1-SP1 | 100 J | No | Yes |
| | M1-SP2 | 100 J | No | No |
| | M1-SP3 | 100 J | Yes | Yes |
| | M1-SP4 | 100 J | Yes | Yes |
| | M1-SP5 | 150 J | No | No |
| | M1-SP6 | 150 J | Yes | Yes |

TABLE 4-continued

Impact and Leak Testing Summary.

| Description | Sample ID | Impact Energy | Leak | Rear Lamina Fracture |
|---|---|---|---|---|
| 2 Layer STF-KEVLAR (Spherical, MD silica) | M10-SP1 | 150 J | No | No |
| | M10-SP2 | 150 J | No | No |
| 3 Layer STF-KEVLAR (Spherical, MD silica) | M11-SP1 | 150 J | No | No |
| | M11-SP2 | 150 J | No | No |
| 4 Layer STF-KEVLAR (Spherical, MD silica) | M12-SP1 | 150 J | No | No |
| | M12-SP2 | 150 J | No | No |
| 2 Layer STF-KEVLAR (PD silica) | M4-SP1 | 100 J | No | No |
| | M4-SP2 | 100 J | No | No |
| | M4-SP3 | 125 J | No | No |
| | M4-SP4 | 150 J | No | Yes |
| | M4-SP5 | 150 J | No | Yes |
| | M4-SP6 | 150 J | No | No |
| 3 Layer STF-KEVLAR (PD silica) | M8-SP1 | 150 J | No | No |
| | M8-SP2 | 150 J | No | Yes |
| 4 Layer STF-KEVLAR (PD silica) | M9-SP1 | 150 J | No | No |
| | M9-SP2 | 150 J | Yes* | Yes* |
| 2 Layer STF-KEVLAR (CaCO$_3$) | M7-SP1 | 150 J | No | No |
| | M7-SP2 | 150 J | No | Yes |

*Specimen M9-SP2 had a fracture at the sample support edge (see FIG. 9) that cracked through the thickness and allowed leakage. The specimen did not leak due to through thickness damage in the direct impact zone.
MD, monodisperse;
PD, polydisperse.

Example 5. Impact of STF-Composites and Interaction with EPG Layers

Figure 11:
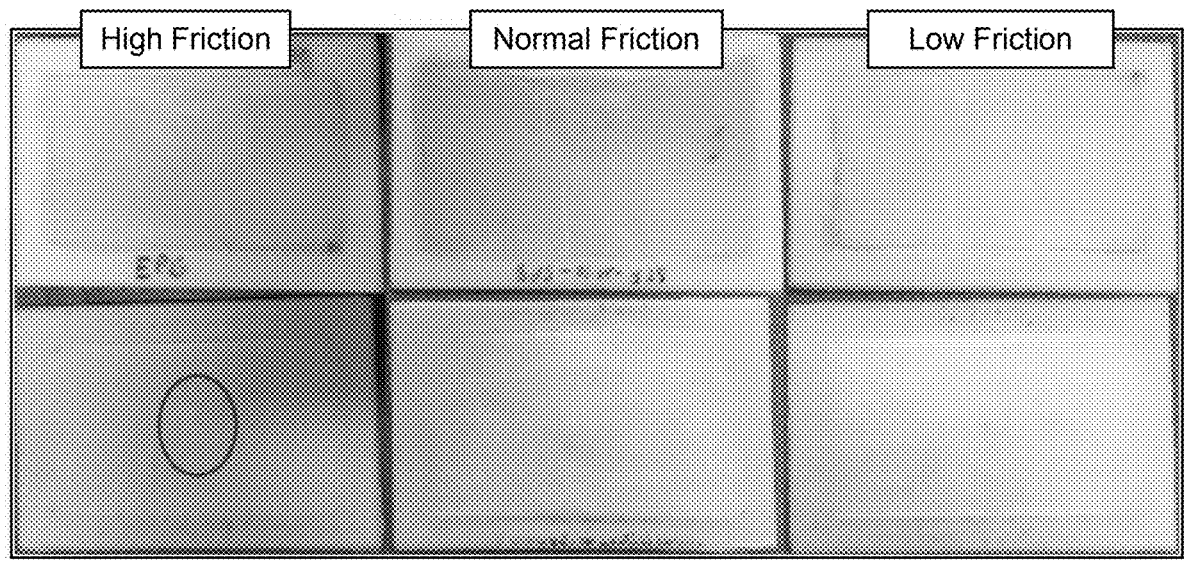
FIG. 11 depicts images showing the effect of EPG-on-composite friction on the impact resistance of the STF-composites. All samples had two layers of MD silica-based STF-KEVLAR. Normal friction samples (middle column) had Orthofabric, Mylar MLI, and neoprene-coated Nylon layers from the current TMG disposed over the top of the samples. The high friction test (left column) included the current TMG urethane-coated bladder adjacent to the composite. For low friction (right column), a thin Teflon sheet was disposed between the neoprene-coated Nylon and composite. The results showed that damage decreased as the friction between the EPG and the composite decreased. The low friction target displayed some evidence of impact-face cracking, but exhibited only minimal rear-face damage. In contrast, the high friction test yielded an unexpected rear lamina fracture (circle) that allowed for leakage. The high friction target was the only STF-composite sample made with the final 2-STF-layer design that exhibited leakage after a 150 J impact, highlighting the importance of considering system-level interactions between the EPG and composite when designing new materials.

While the impact tests discussed above consisted of direct impact of the steel ASTM D-7136 impactor onto the composite face, when the composites are used in construction of space suits and other similar protective wear there typically is an EPG on the outside of the hard composite. The added thickness of the textile layers in the EPG may initially be expected to add some cushioning to reduce the severity of impact on the composite. However, test results revealed that the added layers could potentially increase the severity of damage if there is significant frictional bonding between the innermost EPG layer and the composite. Impact testing was performed on M10 2-layer STF-composite specimens using the monodisperse silica formulation, and testing was performed with current TMG materials on top of the composite, along with the addition of friction-modifying materials placed between the EPG and the hard composite's strike face. The TMG layers consisted of Orthofabric, 7 layers of aluminized Mylar, and the neoprene-coated Nylon absorber fabric layer. This configuration corresponded to the normal friction results shown in the center images in FIG. 11. Some impact-face cracking was seen in the normal friction impact test, but no rear lamina fracture was observed, and the sample did not leak when pressure tested.

The high friction test configuration used the same TMG layers, except with the urethane-coated bladder cloth added between the neoprene-coated Nylon and composite face. The urethane coating on the bladder cloth was oriented towards the composite to create a high-grip, high-friction interface between the composite and textile. Both of the specimens impacted in the high friction configuration exhibited rear lamina fracture and through-thickness damage, as revealed by subsequent leak testing. The high friction specimens were the only specimens made with the M10 2-STF-layer STG-composite design (13 total specimens) that leaked after 150 J impact. The increased friction provided by the urethane coated bladder completely negated any added impact cushioning benefit provided by the EPG soft goods.

Figure 12:
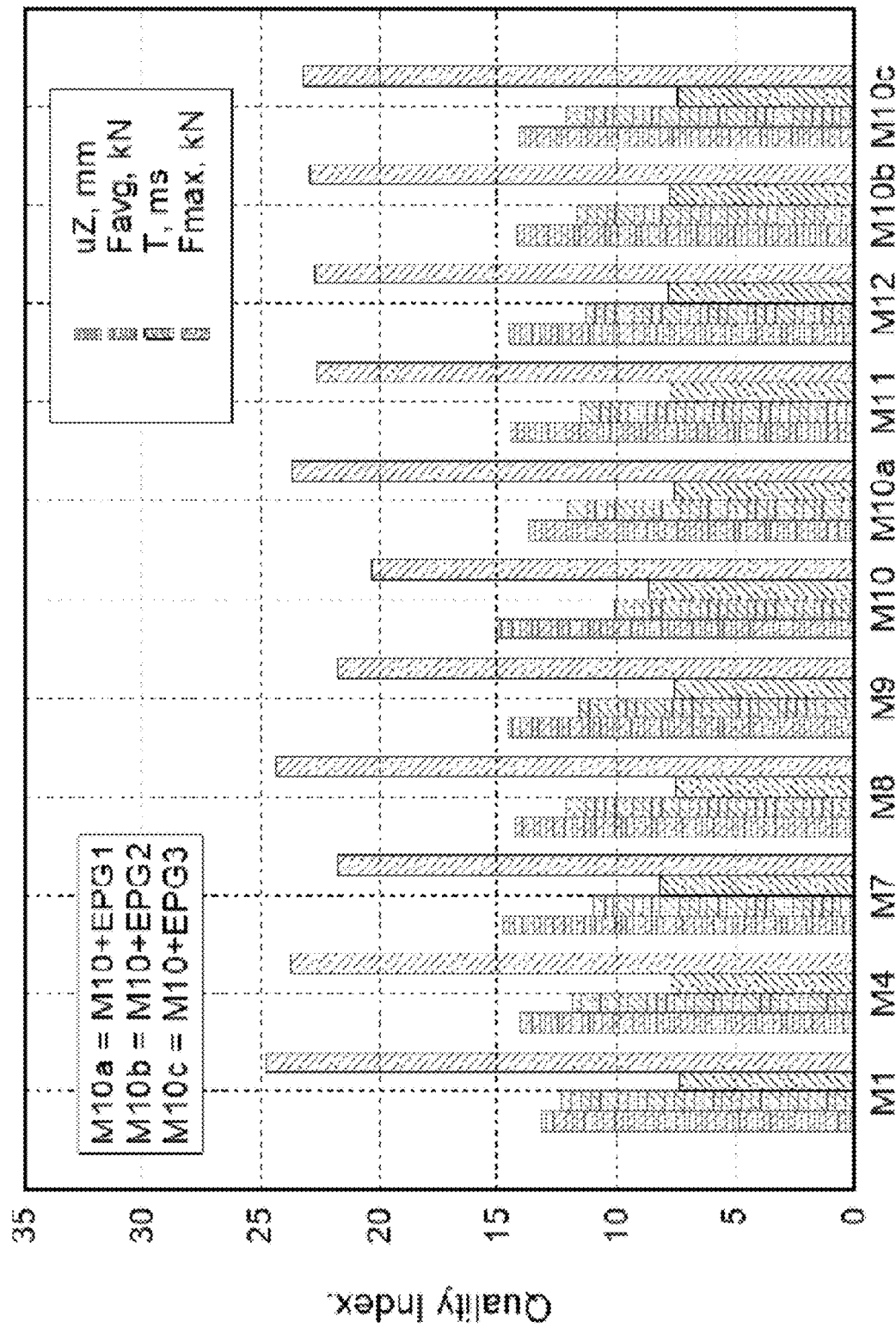
FIG. 12 is a graph summarizing the impact test results for the various STF-composite designs. The y-axis represents the quality index, whereas the test samples are identified on the x-axis. For each sample, the bars represent, from left to right, maximum deflection ($u_z$), average impact force ($F_{avg}$), impact duration (T), and maximum impact force ($F_{max}$). The M10 samples tested with the EPG were M10a (high friction), M10b (low friction), and M10c (normal friction).

The testing on the low friction configuration produced further evidence to support the important role of EPG-on-composite friction in determining overall impact damage. The low friction configuration has a thin Teflon layer between the neoprene-coated Nylon and the composite surface. The low friction sample exhibited the least damage, with only minor impact-face cracking. Overall, the severity of damage was well-correlated with the level of EPG-on-composite friction, with the lowest friction leading to the lowest observed damage. This result points towards an anticipated benefit of purposefully reducing friction between the EPG and the STF-composite in a suit system design. The results are summarized in FIG. 12.

Example 6. Alternative STF-Composite Designs

In another embodiment, an STF-composite was constructed with an STF outer layer on top of a solid composite panel. The strengths of this concept were the ease of manufacture and the potential to create a structure that is very tolerant to impact because all impacts would first hit the STF and be blunted before the composite is engaged. However, the outer layer structure had a higher weight than other solutions. A potential benefit of the design was that the STF layer could be integrated as part of a soft goods cover lay-up to provide additional impact resistance in areas where it is needed while leaving the composite layer unchanged. Another concept involved the dispersion of STF in the resin and subsequent infusion into the fabric. The shear thickening response of the STF required long process times and/or high energy to break the fluid up into drops small enough to penetrate into the yarns.

Example 7. Testing of an Open Window STF-composite Design

Figure 13:
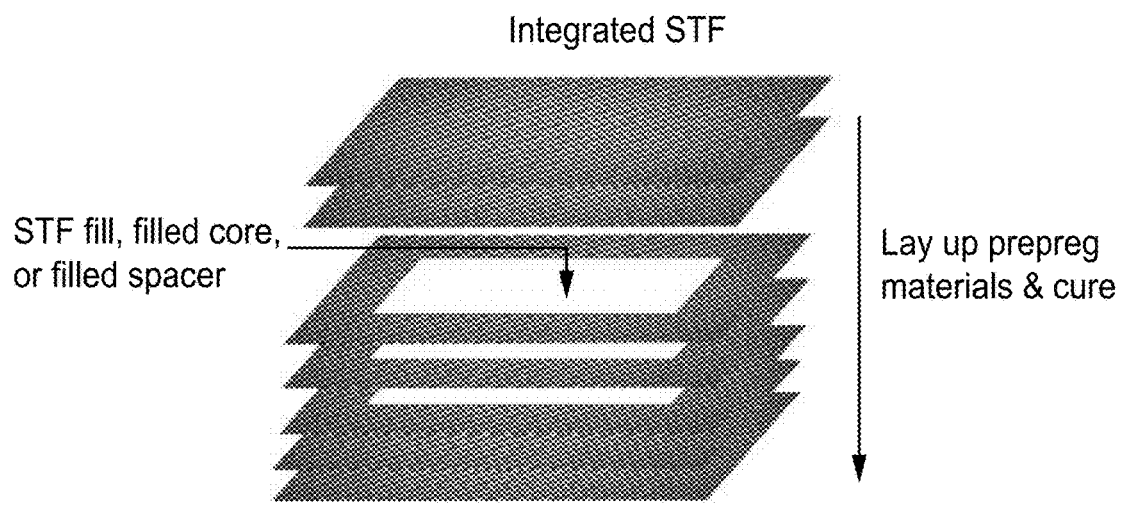
FIG. 13 depicts a conceptual illustration of the structure of the STF interlayer samples for fluid-filled targets. The samples were fabricated with four layers on the top and bottom and seven layers in the central "window" section.
Figure 14:
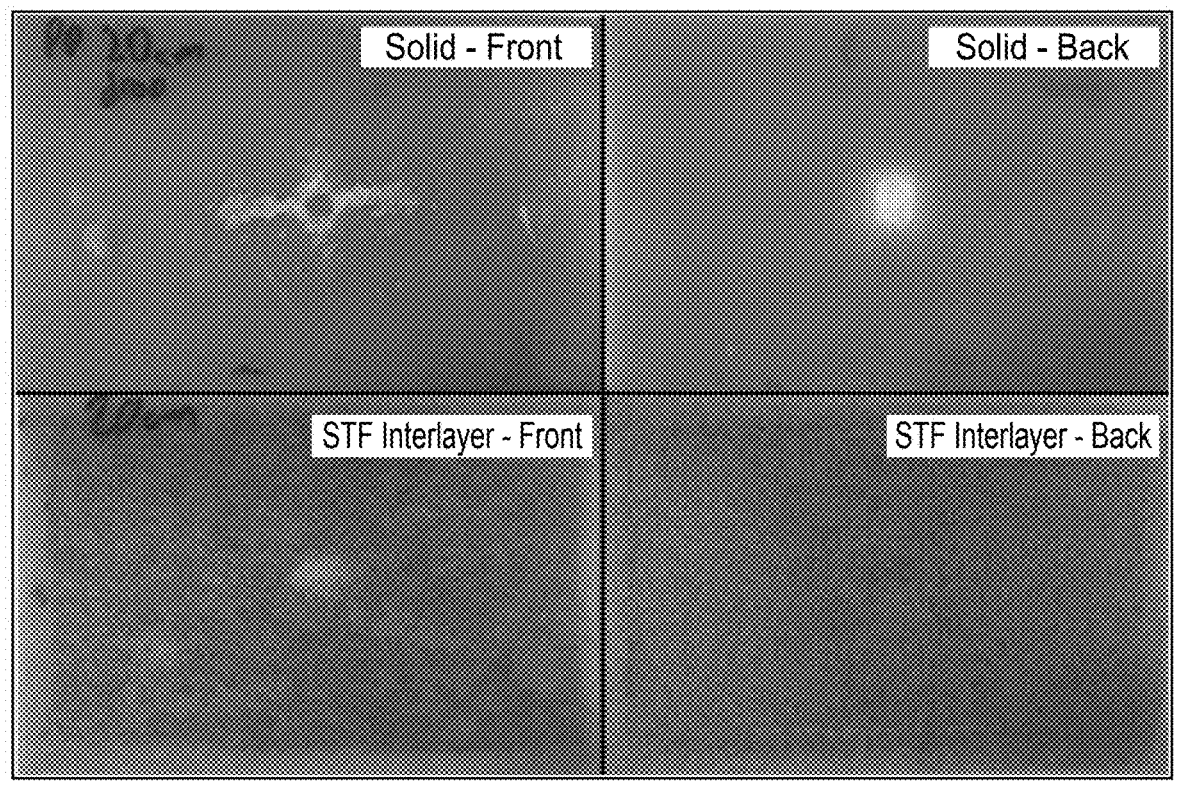
FIG. 14 shows photographs of the results of a 20 J impact on a solid 7781 E-glass panel (top panels [left panel, front; right panel, back]) and a 25 J impact on a 7781 E-glass panel with an interlayer of STF embedded in a polyester spacer fabric (bottom panels [left panel, front; right panel, back]).
Figure 15:
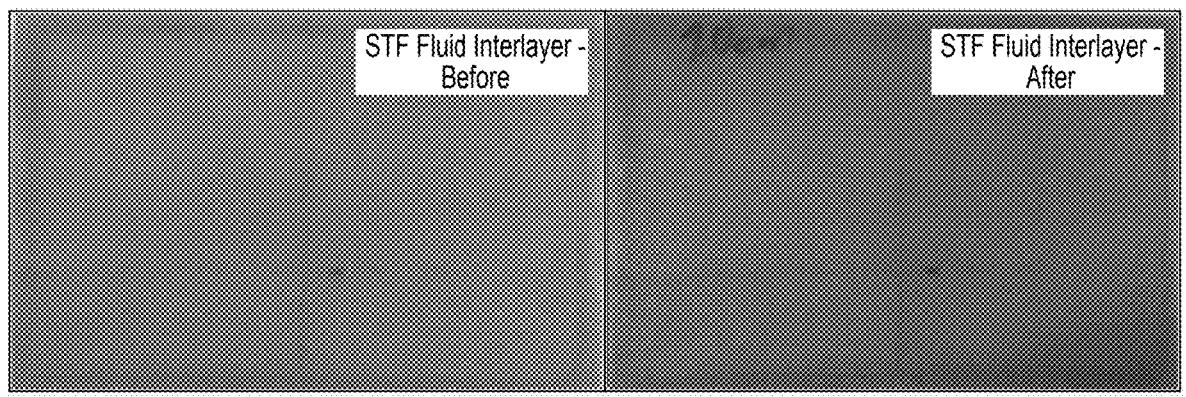
FIG. 15 shows photographs of panels containing liquid STF with no spacer fabric before a 20 J impact (left) and after a 20 J impact (right).

Panels were created with an open "window" into which STF was poured and then sealed by curing additional layers of fiberglass on top. Alternatively, a second method utilized a polyester textile (Style DNB36, Apex Mills, Inwood, NY) soaked in STF, which allowed for better control of the thickness of the STF interlayer. Both types of interlayer structures were fabricated with 4 layers of 7781 E-glass prepreg on the bottom, followed by a frame that was 7 layers thick, followed by an additional 4 layers on top. A conceptual illustration is shown in FIG. 13. A solid, 15-layer panel was fabricated for comparison. Various processing methods were attempted, and it was found that the press method described in Example 1 was best suited for production of the interlayer samples due to superior control of the thickness and flatness of the samples. Impact testing was performed on the solid panel and STF interlayer samples using the drop impact procedure described above. A comparison of the impact damage on the solid and STF interlayer (with polyester spacer) is shown in FIG. 14. Based on the actual measured impact velocities, the solid panel was impacted at 20 J and the STF panel at 25 J. The solid panel showed noticeable damage on both the front and back faces, with evidence of delamination visible on the back of the panel. The front of the solid panel showed a damage zone moving away from the impact zone along the direction of the fiber axes. In contrast, the STF interlayer target showed only very localized damage to the direct impact zone on the front face. Inspection of the rear face of the STF interlayer target revealed no visible damage. FIG. 15 shows similar results of a 20 J impact onto a target containing and STF interlayer with no spacer fabric. There was no visible damage on either face of the STF interlayer panel after impact.

Figure 16A:
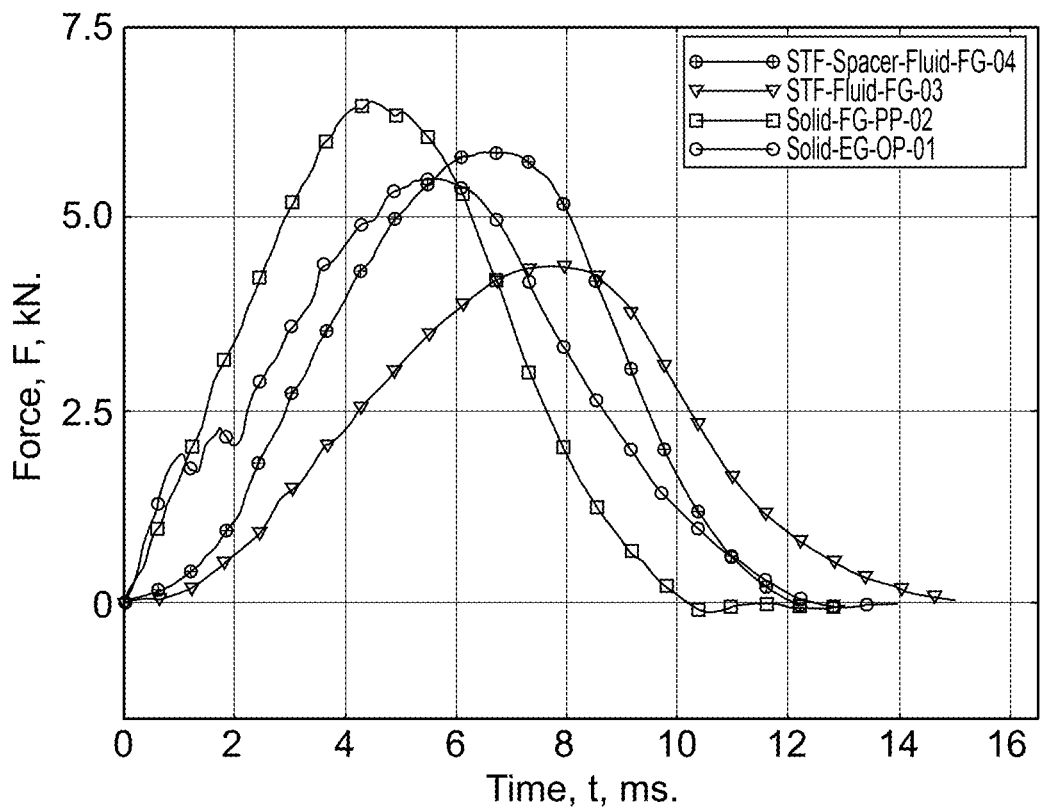
FIG. 16A is a graph depicting a force-time curve for low velocity impact on a solid STF panel (squares and light circles), STF fluid interlayer (triangles), and STF in a spacer fabric interlayer (dark circles). The y-axis represents the impact force in newtons (N), and the x-axis represents time in milliseconds (ms).
Figure 16B:
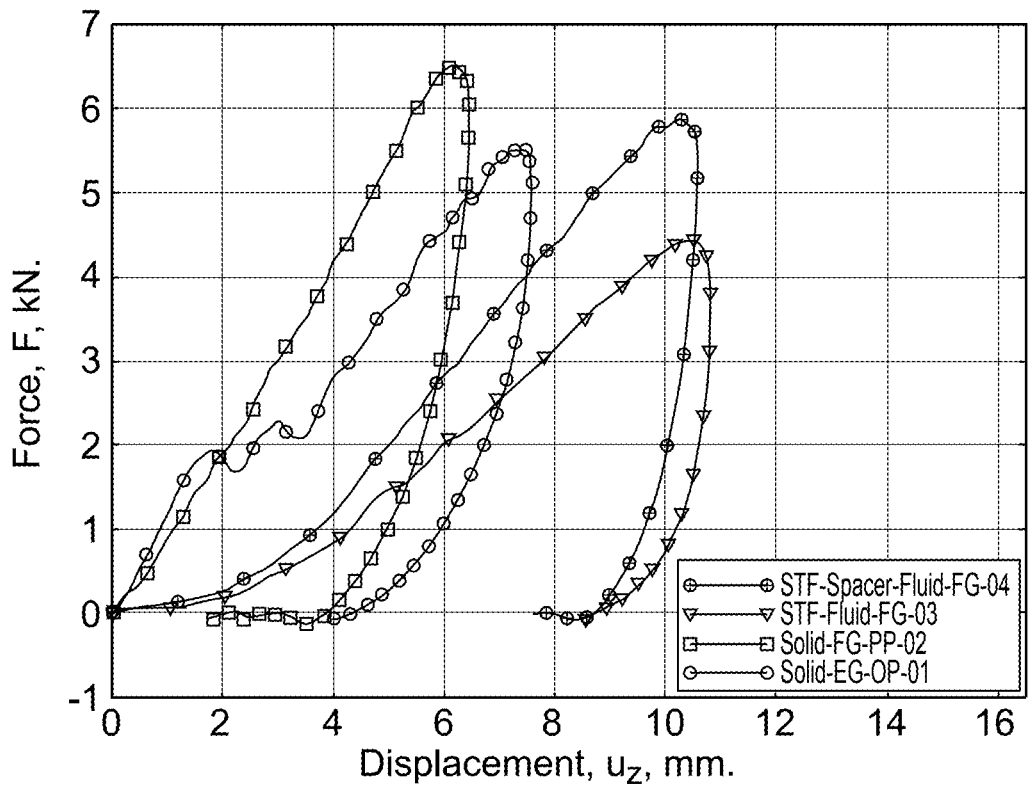
FIG. 16B is a graph depicting a force-displacement curve for low velocity impact on a solid STF panel (squares and light circles), STF fluid interlayer (triangles), and STF in a spacer fabric interlayer (dark circles). The y-axis represents the impact force in newtons (N), and the x-axis represents displacement in millimeters (mm).

The force-time and force-displacement profiles for the impacts on the solid (20 J), STF fluid layer (20 J), and STF spacer fabric layer (25 J) samples are shown in FIGS. 16A and 16B, respectively. Despite a 25% higher impact energy compared to the solid panel, the STF spacer fabric panel had a peak impact force that was approximately 10% lower than the solid panel. The impact stiffness of the STF spacer sample (which had only 8 layers of fabric, in two bonded groups of 4 on top and bottom as compared to the 15 for the solid panel) was 30% lower than the solid panel. The dissipated energy calculated from the area under the force-displacement curve showed that the fractions of total impact energy dissipated by the STF fluid sample, the STF spacer samples, and solid panel were 91.9%, 90.0%, and 79.8%, respectively. As noted above, minimal damage was observed in the STF samples compared to the significant cracking and delamination observed for the solid panel at similar impact energy. Thus, the results indicated that STF provides a mechanism for absorbing impact energy in a manner that can mitigate damage through the thickness of the structure and therefore increase the durability and impact resistance of the structure. Further, the use of a spacer fabric did not significantly decrease the energy absorption offered by the STF. Based on these results, a fabric soaked in STF (i.e. an STF prepreg) was deemed to provide an easier means for working with the material and incorporating STF into a structure compared to working with the fluid alone. STF prepregs have the additional advantage of being easier to use than liquid STF interlayers in the manufacture of composites with curved or complex shapes.

Example 8. Impact Testing of the STF Outer Layer Design

Figure 17:
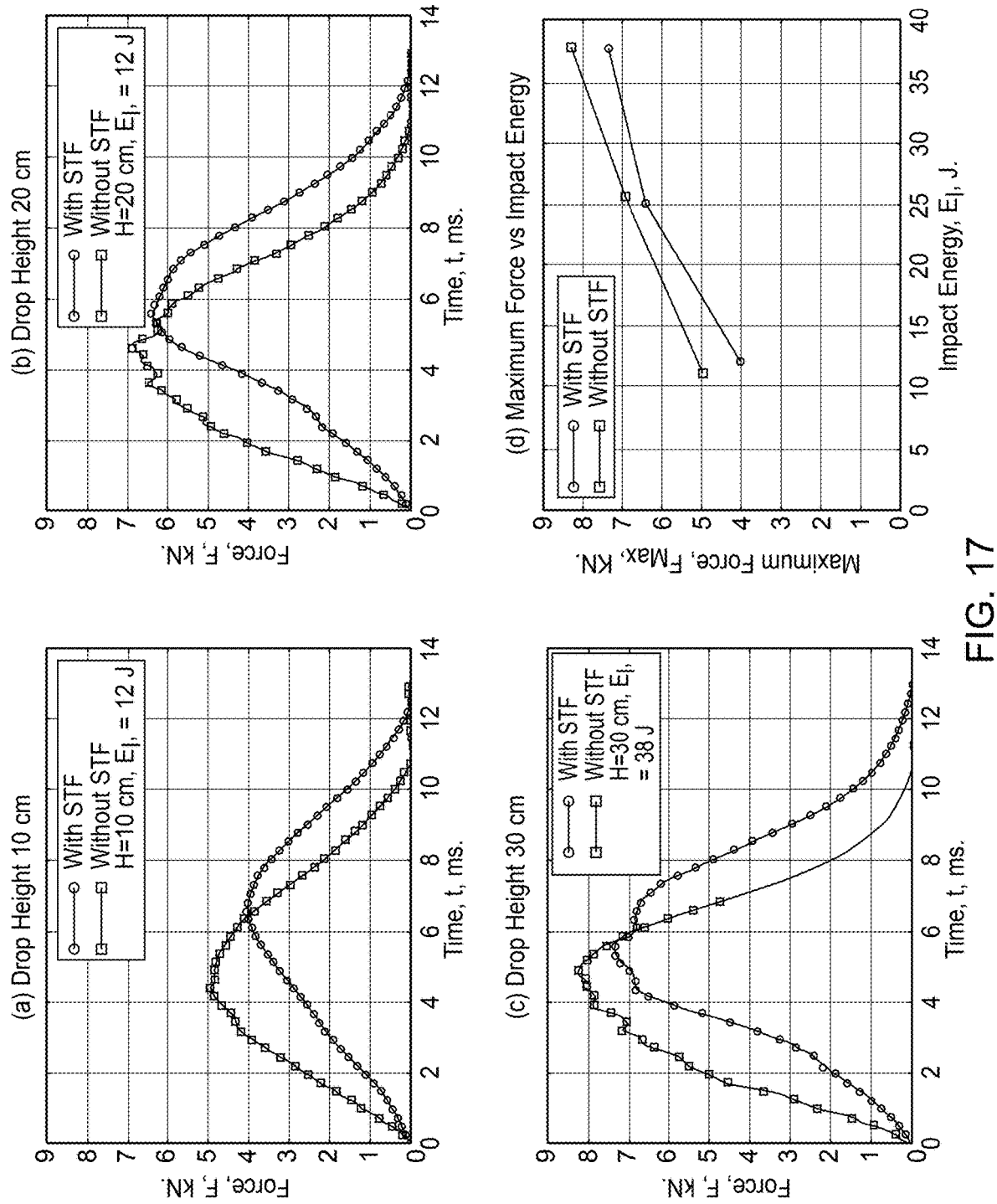
FIG. 17 are graphs depicting force-time curves for impact on G10 panels with an STF cover layer (circles) and without an STF cover layer (squares). The drop heights are 10 cm (panel A), 20 cm (panel B), and 30 cm (panel C). Panel D shows the maximum force versus impact energy. For panels A, B, and C, the y-axis represents force in newtons (N) and the x-axis represents time in milliseconds (ms). For panel D, the y-axis represents the maximum force in kilonewtons (kN), and the x-axis represents the impact energy in joules (J).
Figure 18:
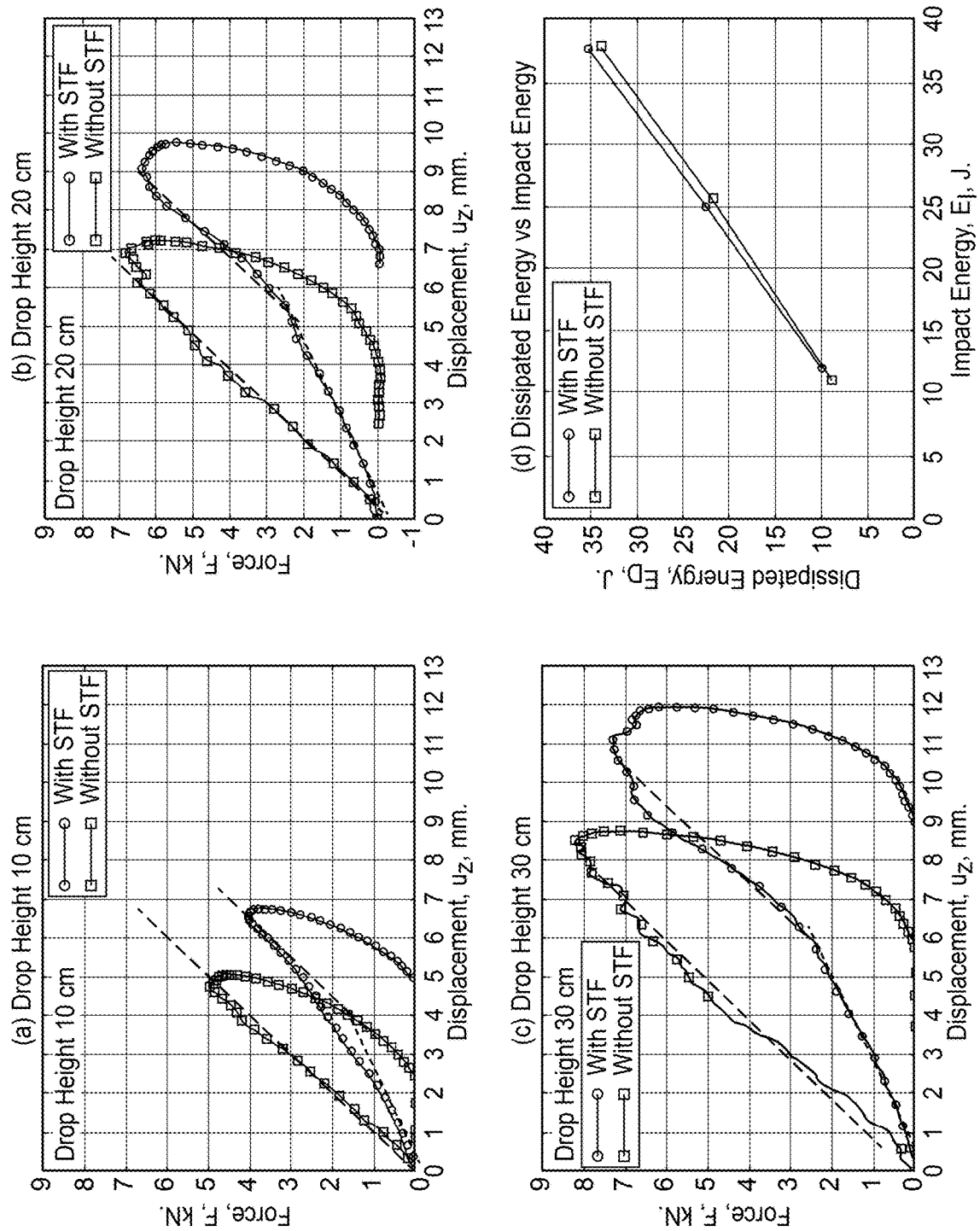
FIG. 18 are graphs depicting force-displacement curves for impact on G10 panels with an STF cover layer (circles) and without an STF cover layer (squares). The drop heights are 10 cm (panel A), 20 cm (panel B), and 30 cm (panel C). Panel D shows the dissipated energy versus impact energy. For panels A, B, and C, the y-axis represents force in newtons (N) and the x-axis represents time in milliseconds (ms). For panel D, the y-axis represents the dissipated energy in joules (J), and the x-axis represents the impact energy in joules (J).

The STF outer layer concept was tested by fabricating thin packets containing STF with a spacer fabric to control thickness. The STF packet consists of a knitted polyester spacer fabric having the desired thickness that is filled with STF and then sealed within a polymeric film. STF packets are made by creating a pouch of polymeric film sealed on three sides, inserting the spacer fabric into the pouch, filling with STF, and then vacuum sealing the fourth side to completely enclose the spacer fabric and STF. The cover layer can potentially be implemented without modification of the composite structure, processing, or mechanical properties. The flexible STF layer could also be implemented as part of a larger soft goods cover layer. The tested STF packets were 0.125 in. thick. Impact tests were performed at energies of 13 J, 26 J, and 39 J (10 cm, 20 cm, 30 cm) using the Dynatup LVI system. A standard G10 fiberglass panel was used as the backing material. Impact curves with and without the STF cover layer are compared in FIGS. 17 (Force-time) and 18 (Force-displacement). From the force-time curves, it was revealed that the addition of the STF cover spread the impact event over a longer time and reduced the maximum force by 10% to 20%, depending on the impact energy. The force-displacement curves showed two distinct zones of loading, which represented the series configuration of the STF cover layer and composite panel. The initial compression of the STF packet lead to a gradual rise in force and lower initial stiffness compared to the solid panel. However, as the impact proceeded, the measured stiffness increased to that of the composite panel alone. FIG. 18 illustrates the two different regions of effective stiffness seen during impact with the thicker dashed line showing the STF-dominated region and the thinner dashed line showing the composite-dominated region. The slopes of the dashed thin and thick lines are the same on all plots. For the 26 J and 39 J impacts, the transition between the two regions was sharp, whereas there was a more gradual transition seen in the lowest energy impact. The sharp transition was attributed to the fluid "bottoming out", or flowing outwards from the zone between the impact tup and composite panel. Damage to the spacer fabric was also consistent with this mechanism.

The spacer fabric from the 26 J and 39 J impacts had a hole in the center consistent with the fluid flowing out from the impact zone acting to pull apart the fabric. Similar damage was not seen for the lowest energy impact. These results suggested that the impact resistance could be improved by increasing the strength of the STF, particularly in tension as it is squeezed out from below the tup. Two strategies for achieving this included the addition of short, chopped fibers to the STF as described in Nam et al. [Proceedings of the Society for the Advancement of Material and Process Engineering Conference, 2004, Long Beach, CA, USA], the entire contents of which are incorporated herein by reference, or the use of a fabric reinforcement to improve tensile properties of the STF cover layer. Overall, the initial impact results suggested that STF cover layers could effectively act to dissipate energy and blunt impact to composite structures, but the STF in the cover layer required reinforcement in the form of fibers or fabric.

Example 9. Modeling of STF Impact

Figure 19A:
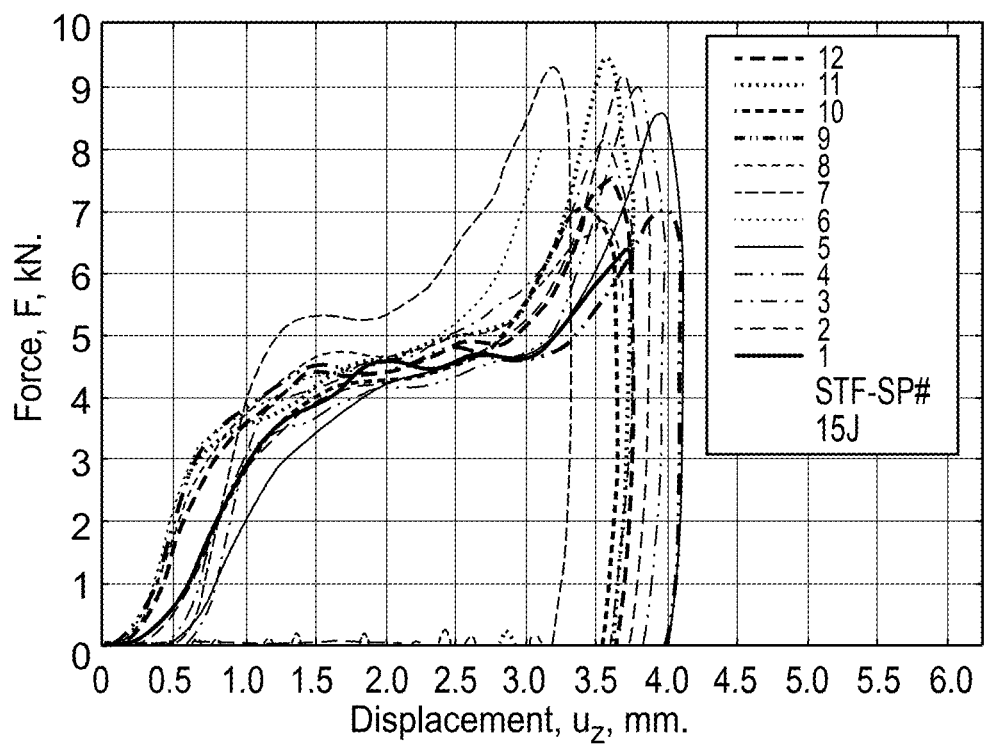
FIG. 19A is a graph depicting the LVI load-displacement curves for STF packets on top of a hard steel support. The y-axis represents force in newtons (N), and the x-axis represents displacement in millimeters (mm).
Figure 19B:
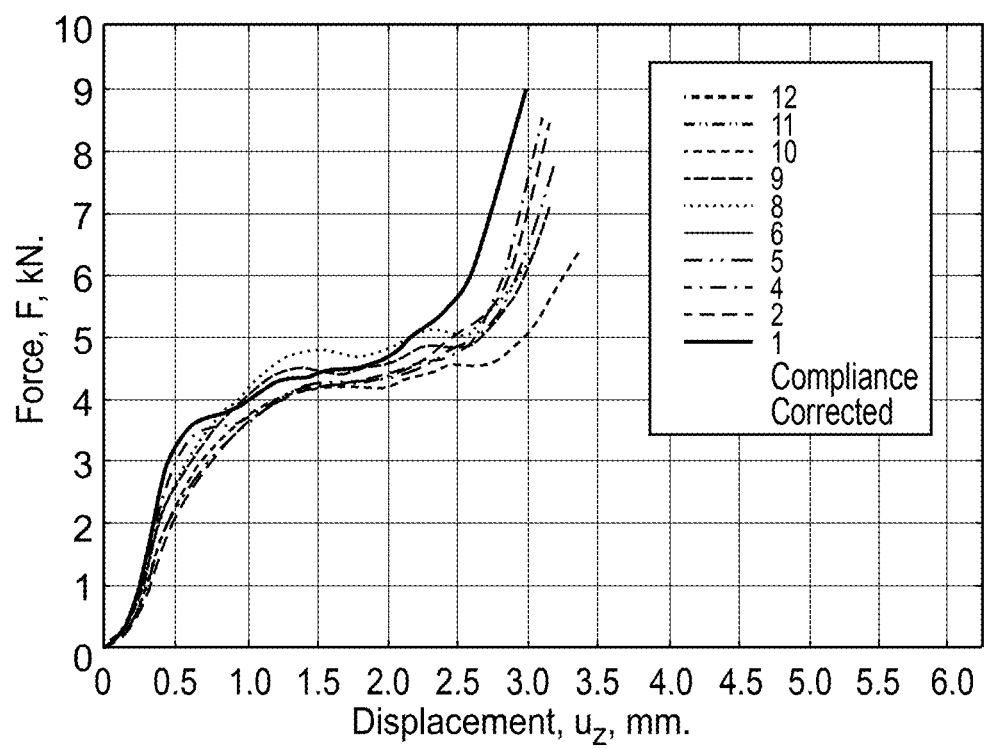
FIG. 19B is a graph depicting the compliance correction and origin shifting curves for STF packets on top of a hard steel support. The y-axis represents force in newtons (N), and the x-axis represents displacement in millimeters (mm).
Figure 19C:
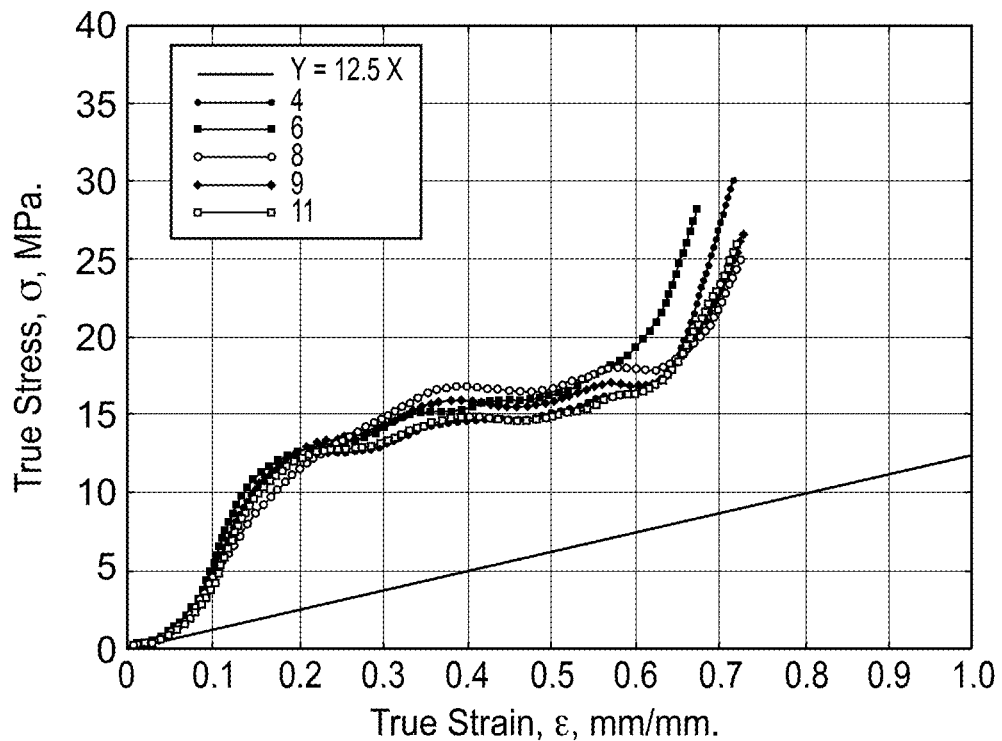
FIG. 19C is a graph depicting true stress versus true strain for STF packets on top of a hard steel support. The y-axis represents force in true stress in Megapascals (MPa), and the x-axis represents true stain millimeters (mm).
Figure 19D:
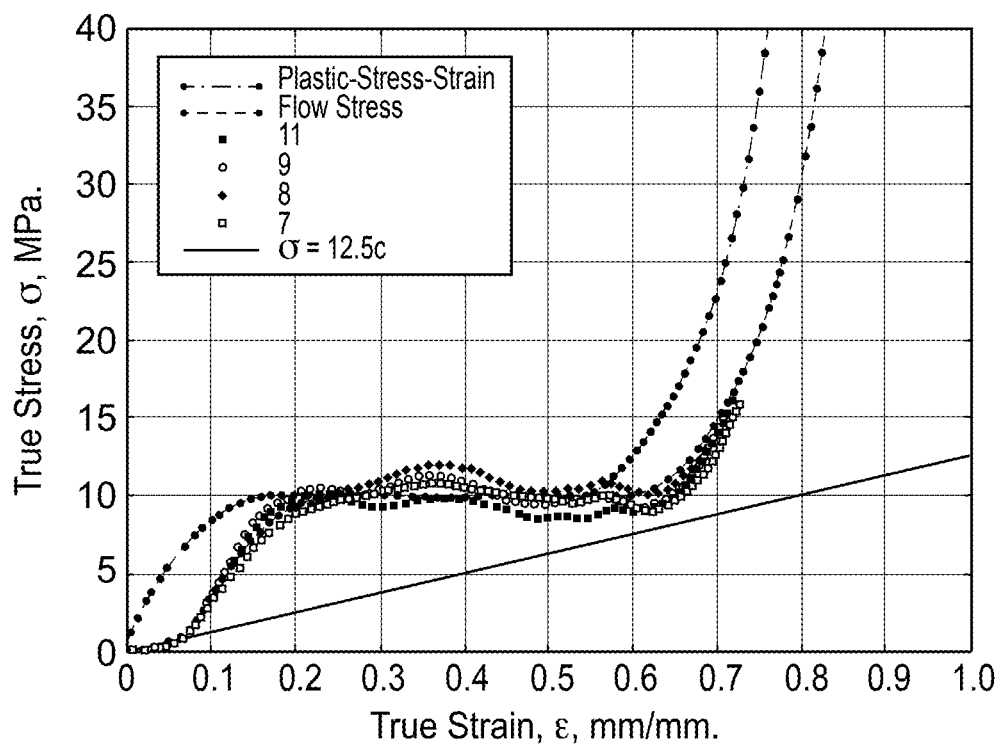
FIG. 19D is an illustration of the development of the piecewise plasticity model of the material. The y-axis represents force in true stress in Megapascals (MPa), and the x-axis represents true stain millimeters (mm).

Impact test results for STF packets impacted at different energies were used to develop a piecewise plasticity model to represent the impact response of the STF. The results of 12 impacts on STF packets are shown in FIG. 19. The procedure to obtain a piecewise plasticity model is illustrated in FIG. 19D.

The present invention is not limited to the embodiments described and exemplified herein. It is capable of variation and modification within the scope of the appended claims.

We claim:

1. A multi-layer hybrid composite with increased impact resistance and damage tolerance, the composite comprising:
   (1) a first composite member comprising one or more composite layers having a first outer perimeter; and
   (2) at least one energy absorber layer disposed on or within the one or more composite layers, the energy absorber layer having a second outer perimeter disposed within the first outer perimeter, the energy absorber layer comprising:
      (i) a fabric comprising a plurality of fibers having a tensile strength of at least about 250 MPa; and
      (ii) a shear thickening fluid comprising at least one carrier fluid in which is suspended particles having an average particle size of less than about 4,000 nm, wherein the shear thickening fluid is intercalated into the fabric;
   wherein the energy absorber layer confers to the multi-layer hybrid composite increased impact resistance and damage tolerance as compared to a multi-layer composite without an energy absorber layer;
   wherein the carrier fluid is a hydrocarbon fluid, a fluorinated polyether, a silicone fluid, or a combination of a hydrocarbon fluid and a fluorinated polyether; and
   wherein the carrier fluid comprises a perfluoropolyether or a multiply-alkylated cyclopentane.

2. The multi-layer hybrid composite of claim 1, wherein:
   (a) the plurality of fibers have a tensile strength of at least about 1 GPa and a specific strength of at least about 1,500 kN*m/kg; or
   (b) the suspended particles have an average particle size of less than about 1,000 nm; or
   (c) both (a) and (b).

3. The multi-layer hybrid composite of claim 1, wherein each composite layer of the first composite member comprises a plurality of carbon fibers, glass fibers, or combination of carbon fibers and glass fibers.

4. The multi-layer hybrid composite of claim 1, wherein the plurality of fibers of the fabric are selected from the group consisting of aramid fibers, ultra-high molecular weight polyethylene fibers, expanded/stretched polytetrafluoroethylene fibers, polyethylene terephthalate fibers, fibers made from copolymers of paraphenylenediamine and diaminodiphenyl ether, aromatic polyester fibers produced by polycondensation of 4-hydroxybenzoic acid and 6-hydroxynapthalene-2-carboxylic acid, and any combination thereof.

5. The multi-layer hybrid composite of claim 1, wherein the carrier fluid is a low volatility carrier fluid having a vapor pressure of less than about $1 \times 10^{-6}$ mPa at 25° C., and wherein the particles are silica particles suspended in the low volatility carrier fluid at a concentration in a range from about 40% to about 85% by weight particles.

6. The multi-layer hybrid composite of claim 1, further comprising a second composite member disposed on the at least one energy absorber layer, the second composite member comprising one or more composite layers, wherein each composite layer of the second composite member comprises a plurality of carbon fibers, glass fibers, or a combination of carbon fibers and glass fibers.

7. The multi-layer hybrid composite of claim 6, further comprising an additional energy absorber layer disposed on the second composite member and a third composite member disposed on the additional energy absorber layer, wherein the additional energy absorber layer comprises a fabric comprising a plurality of fibers having a tensile strength of at least about 250 MPa and a shear thickening fluid comprising at least one carrier fluid in which is suspended particles, wherein the shear thickening fluid is intercalated into the fabric; and wherein the third composite member comprises one or more composite layers, wherein each composite layer of the third composite member comprises a plurality of carbon fibers, glass fibers, or a combination of carbon fibers and glass fibers.

8. The multi-layer hybrid composite of claim 7, wherein:
   (1) the fabric of the additional energy absorber layer comprises a plurality of fibers selected from the group consisting of aramid fibers, ultra-high molecular weight polyethylene fibers, expanded/stretched polytetrafluoroethylene fibers, polyethylene terephthalate fibers, fibers made from copolymers of paraphenylenediamine and diaminodiphenyl ether, aromatic polyester fibers produced by polycondensation of 4-hydroxybenzoic acid and 6-hydroxynapthalene-2-carboxylic acid, and any combination thereof; and
   (2) the carrier fluid of the additional energy absorber layer is a hydrocarbon fluid, a fluorinated polyether, a silicone fluid, or a combination of a hydrocarbon fluid and a fluorinated polyether.

9. The multi-layer hybrid composite of claim 1, wherein the first composite member comprises at least 5 composite layers.

10. The multi-layer hybrid composite of claim 1, further comprising a structural density of less than about 2 g/cm³ and a thickness of less than about 0.5 cm.

11. A composite structure comprising:
(1) a first composite member comprising one or more composite layers having a first outer perimeter;
(2) a first energy absorber layer comprising a fabric in which is intercalated a shear thickening fluid and wherein the shear thickening fluid comprises at least one carrier fluid in which is suspended particles having an average particle size of less than about 4,000 nm, wherein the fabric of the first energy absorber layer comprises plurality of fibers having a tensile strength of at least about 250 MPa, and wherein the shear thickening fluid comprises about 40% to about 85% by weight of particles; and
(3) a second composite member comprising one or more composite layers having a second outer perimeter;
wherein the first energy absorber layer is disposed between the first composite member and the second composite member, has a third outer perimeter disposed within the first outer perimeter and/or the second outer perimeter, and dissipates impact energy when applied to the composite structure;
wherein each composite layer of the first composite member, the second composite member, or both the first composite member and the second composite member comprises a plurality of carbon fibers, glass fibers, or a combination of carbon fibers and glass fibers; and
wherein the first fabric comprises a plurality of fibers selected from the group consisting of aramid fibers, ultra-high molecular weight polyethylene fibers, expanded/stretched polytetrafluoroethylene fibers, polyethylene terephthalate fibers, fibers made from copolymers of paraphenylenediamine and diaminodiphenyl ether, aromatic polyester fibers produced by polycondensation of 4-hydroxybenzoic acid and 6-hydroxynapthalene-2-carboxylic acid, and any combination thereof;
wherein the carrier fluid of the first shear thickening fluid is a low volatility carrier fluid having a vapor pressure of less than about $1\times10^{-6}$ mPa at 25° C.; and
wherein the low volatility carrier fluid comprises a perfluoropolyether or a multiply-alkylated cyclopentane.

12. The composite structure of claim 11, further comprising:
(4) a second energy absorber layer disposed on the second composite member, the second energy absorber layer comprising a second fabric in which is intercalated a second shear thickening fluid, wherein the second fabric comprises a plurality of fibers having a tensile strength of at least about 250 MPa, and wherein the second shear thickening fluid comprises at least one carrier fluid in which is suspended particles having an average particle size of less than about 4,000 nm, and wherein the shear thickening fluid comprises about 40% to about 85% by weight of particles; and
(5) a third composite member disposed on the second energy absorber layer, the third composite member comprising one or more composite layers, wherein each composite layer of the third composite member comprises a plurality of carbon fibers, glass fibers, or a combination of carbon fibers and glass fibers;
wherein the second fabric comprises a plurality of fibers selected from the group consisting of aramid fibers, ultra-high molecular weight polyethylene fibers, expanded/stretched polytetrafluoroethylene fibers, polyethylene terephthalate fibers, fibers made from copolymers of paraphenylenediamine and diaminodiphenyl ether, aromatic polyester fibers produced by polycondensation of 4-hydroxybenzoic acid and 6-hydroxynapthalene-2-carboxylic acid, and any combination thereof.

13. The composite structure of claim 11, wherein the first shear thickening fluid comprises about 60% to about 70% by weight of particles, wherein the particles are silica particles having an average particle size of between about 300 nm and about 700 nm and an aspect ratio of about 1:1 to about 10:1.

14. The composite structure of claim 11, further comprising a structural density of less than about 2 g/cm³ and a thickness of less than about 0.5 cm.

15. An article comprising the composite structure of claim 11.

16. The article of claim 15, wherein the article is a hard upper torso component of an extravehicular mobility unit, a marine vessel hull, an automobile component, a motorcycle component, a bicycle, a windmill turbine blade, a safety helmet, sporting equipment, or a storage tank.

* * * * *